United States Patent
Darling et al.

(10) Patent No.: US 9,069,736 B2
(45) Date of Patent: Jun. 30, 2015

(54) ERROR PREDICTION WITH PARTIAL FEEDBACK

(71) Applicant: Xerox Corporation, Norwalk, CT (US)

(72) Inventors: William Michael Darling, Grenoble (FR); Guillaume M. Bouchard, Saint-Martin-le Vinoux (FR); Cedric Archambeau, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 198 days.

(21) Appl. No.: 13/937,271

(22) Filed: Jul. 9, 2013

(65) Prior Publication Data
US 2015/0019912 A1    Jan. 15, 2015

(51) Int. Cl.
*G06F 11/00* (2006.01)
*G06F 11/22* (2006.01)
*G06F 11/07* (2006.01)

(52) U.S. Cl.
CPC .......... *G06F 11/2257* (2013.01); *G06F 11/079* (2013.01); *G06F 11/2236* (2013.01)

(58) Field of Classification Search
CPC ............ G06F 11/2257; G06F 11/0721; G06F 11/0751; G06F 11/079; G06F 11/2236; G06F 11/263; G06F 11/277; G06F 11/3024; G06F 11/3452
USPC ........ 714/26, 25, 30, 33, 37, 40, 45, 46, 47.1, 714/47.3
See application file for complete search history.

(56) References Cited

U.S. PATENT DOCUMENTS

| | | | | |
|---|---|---|---|---|
| 6,457,119 | B1* | 9/2002 | Boggs et al. | 712/227 |
| 2001/0014957 | A1* | 8/2001 | Oura | 714/33 |
| 2004/0199821 | A1* | 10/2004 | Flautner et al. | 714/30 |
| 2008/0069456 | A1 | 3/2008 | Perronnin | |
| 2009/0113240 | A1* | 4/2009 | Vera et al. | 714/17 |
| 2012/0045134 | A1 | 2/2012 | Perronnin et al. | |
| 2012/0076401 | A1 | 3/2012 | Sanchez et al. | |
| 2013/0151891 | A1* | 6/2013 | Piry et al. | 714/10 |
| 2013/0151894 | A1* | 6/2013 | Honda et al. | 714/17 |

OTHER PUBLICATIONS

Ritchie, D., "The evolution of the unix time-sharing system" Communications of the ACM 17, pp. 365-375 (1984).
(Continued)

*Primary Examiner* — Joseph D Manoskey
(74) *Attorney, Agent, or Firm* — Fay Sharpe LLP

(57) ABSTRACT

A method for performing data processing through a pipeline of components includes receiving a set of training observations, each including partial user feedback relating to error in data output by the pipeline for respective input data. Some pipeline components commit errors for at least some of the input data, contributing to an error in the respective output data. A prediction model models a probability of a pipeline component committing an error, given input data. Model parameters are learned using the training observations. For a new observation which includes input data and, optionally, partial user feedback indicating that an error has occurred in processing the new input data, without specifying which pipeline component(s) contributed to the observed error in the output data, a prediction is made as to which of the pipeline components contributed to the error in the output (if any).

22 Claims, 15 Drawing Sheets

(56) References Cited

OTHER PUBLICATIONS

Ritter, et al. "Named entity recognition in tweets: an experimental study" Proc. 2011 Conf. on Empirical Methods in Natural Language Processing, Assoc. for Computational Linguistics, pp. 1524-1534 (Jul. 2011).
Ly, et al. "Product review summarization from a deeper perspective" Proc. of the 11$^{th}$ Annual Int'l ACM/IEEE Joint Conf. on Digital Libraries (JDL'11), 2011, pp. 311-314.
Finkel, et al. "Solving the problem of cascading errors: approximate bayesian inference for linguistic annotation pipelines," Proc. 2006 Conf. on Empirical Methods in Natural Language Processing (EMNLP'06), pp. 618-626 (2006).
Blair-Goldensohn, et al. "Building a sentiment summarizer for local service reviews," NLP in the Information Explosion Era, 2008, pp. 1-10.
Lu, et al., "Rated aspect summarization of short comments" Proc. 18$^{th}$ Int'l. Conf. on World wide web (WWW '09), 2009, pp. 131-140.
Zhai, et al. "Identifying evaluative sentences in online discussions" Proc. 25th AAAI Conference on Artificial Intelligence (AAAI 2011), pp. 1-6 (2011).
MacCartney, et al. "Learning to recognize features of valid textual entailments," in Proc. of the Main Conf. on Human Language Technology—Conf. on the North American Chapter of the Assoc. of Computational Linguistics (HLT-NAACL'06), pp. 41-48 (2006).
Cunningham, et al. "Software infrastructure for natural language processing" Proc. 5$^{th}$ Conf. on Applied natural language processing (ANLC'97), pp. 237-244 (1997).
Lamb, et al., Separating fact from fear: Tracking flu infections on twitter Proceedings of NAACL-HLT, 2013, pp. 789-795.
Koller, et al. "Probabilistic Graphical Models: Principles and Techniques," MIT Press, pp. 1-16 (2009).
Bottou, L. "Large-scale machine learning with stochastic gradient descent," Proc. 19$^{th}$ Int'l. Conf. on Computational Statistics (COMPSTAT'2010), pp. 177-187 (Aug. 2010).
Liang, et al. "Online em for unsupervised models," in Proc. Human Language Technologies: 2009 Annual Conf. of the North American chapter of the Assoc. for Computational Linguistics (NAACL'09), pp. 611-619 (2009).
Fayyad, et al. "Initialization of iterative refinement clustering algorithms" Proc. 4$^{th}$ Int'l. Conf. on Knowledge discovery and data mining, pp. 194-198 (1998).
Wilson, et al. "Recognizing contextual polarity in phrase-level sentiment analysis," Proc. Conf. on Human Language Technology and Empirical Methods in Natural Language Processing (HLT'05), pp. 347-354 (2005).
Nenkova, et al. "A compositional context sensitive multi-document summarizer: exploring the factors that influence summarization," in Proc. 29$^{th}$ Annual Int'l. ACM SIGIR Conf. on Research and Development in Information Retrieval (SIGIR'06), pp. 573-583 (2006).
Blei, et al. "Latent dirichlet allocation," J. Mach. Learning Res. 3, pp. 993-1022 (2003).
Xiong, et al. "Error detection for statistical machine translation using linguistic features," Proc. 48$^{th}$ Annual Meeting of the Assoc. for Computational Linguistics (ACL'10), pp. 604-611 (2010).
Ueffing, et al. "Word-level confidence estimation for machine translation," Comput. Linguist. 33(1), pp. 9-40 (Mar. 2007).
Koehn, P., et al., "Moses: Open source toolkit for statistical machine translation," Proc. ACL, Demo and Poster Sessions, pp. 177-180 (2007).
Marciniak, et al. "Beyond the pipeline: discrete optimization in NLP," in Proc. 9th Conf. on Computational Natural Language Learning (CONLL '05), Association for Computational Linguistics, pp. 136-143 (2005).
Neal, R.M., "Learning stochastic feedforward networks" *Department of Computer Science*, 1990, pp. 1-34.

* cited by examiner

ERROR PREDICTION WITH PARTIAL FEEDBACK

BACKGROUND

The exemplary embodiment relates to the field of pipeline system processing and finds particular application in a system and method for predicting and addressing errors in individual components of a pipeline system.

Pipeline processing is a common technique in computing since its development in the 1970's. See, for example, D. M. Ritchie, "The evolution of the unix time-sharing system," Communications of the ACM, 17:365-375, 1984. The idea behind the technique is that complex processing can be achieved by decomposing a process into a series of more basic components, each performing part of the process. In some cases this can produce a more intricate output than would have been possible with a single method. It has been used, for example, in Natural Language Processing (NLP) applications, such as named entity recognition (Ritter, et al., "Named entity recognition in tweets: An experimental study," Proc. 2011 Conf. on Empirical Methods in Natural Language Processing, pp. 1524-1534 (July 2011)), text summarization (Ly, et al., "Product review summarization from a deeper perspective," Proc. 11th Annual Intern'l ACM/IEEE Joint Conf. on Digital libraries, JCDL '11, pp. 311-314 (2011)), and in recognizing textual entailment (Finkel, et al., "Solving the problem of cascading errors: approximate bayesian inference for linguistic annotation pipelines," Proc. 2006 Conf. on Empirical Methods in Natural Language Processing, EMNLP '06, pp. 618-626 (2006)). For example, comment or opinion summarization systems may make use of a pipeline-like architecture in which a first component filters out spam comments and then a second component categorizes the comments into aspects. In identifying evaluative sentences, MacCartney, et al. proposes a three stage approach to textual inference: linguistic analysis (which is a pipeline itself), followed by graph alignment, ending with determining an entailment (see, MacCartney, et al., "Learning to recognize features of valid textual entailments," Proc. Main Conf. on Human Language Technology Conference of the North American Chapter of the Association of Computational Linguistics, HLT-NAACL '06, pp. 41-48, (2006)). Software architectures are available for building NLP pipelines, such as GATE (see, Cunningham, et al., "Software infrastructure for natural language processing," Proc. 5th Conf. on Applied Natural Language Processing, ANLC '97, pp. 237-244 (1997)). In the case of classification, running two binary classifiers in a series can result in improved results over a more complex multiclass classification approach (see, Lamb, A., Paul, M. J., Dredze, M., "Separating fact from fear: Tracking flu infections on Twitter," Proc. NAACL-HLT pp. 789-795, 2013).

One problem with a pipeline approach is that when errors occur, it is difficult to identify the root cause. This is because when data have been processed through a pipeline of components, there may only be access to partial feedback. That is, an input X goes through a series of components that ultimately results in an output Y. Each component in the processing pipeline performs some action on X, and each of the components may result in an error. However, the user often only has access to the final output, and so it is unclear which of the components was at fault when an error is observed in the final output. While in some cases, a user may be able to provide feedback with respect to at least some of the components, this may entail much more work on the user's part and may also be prone to inaccuracies if it is difficult for the user to identify the source of errors.

There remains a need for a system and method for predicting the root cause(s) of errors in a pipeline, given information that an error has occurred or not, and the input and output data.

BRIEF DESCRIPTION

In accordance with one aspect of the exemplary embodiment, a method for performing data processing through a pipeline of components includes receiving a set of training observations for a pipeline which includes a plurality of pipeline components. Each observation includes partial user feedback relating to error in data output by the pipeline for respective input data. Each of the plurality of pipeline components commits errors for at least some of the input data which contributes to an error in the respective output data. An error prediction model is generated which, for each the plurality of components, models a probability of the component committing an error given input data. Parameters of the error prediction model are learned using the set of training observations. A new observation for the pipeline is received. The new observation includes at least one of input data and partial user feedback relating to error in data output by the pipeline for the input data, the user feedback for the new observation indicating that an error has occurred without specifying which of the plurality of pipeline components contributed to the error partial user feedback relating to error in data output by the pipeline for respective input data. The method further includes probabilistically inferring which of the plurality of pipeline components in the pipeline contributed to any error in the data output by the pipeline, based on the input data for the new observation and the error prediction model. Information is output that is based on the inference.

At least one of the generating an error prediction model and the probabilistically inferring which of the plurality of pipeline components contributed to the error in the data output by the pipeline may be performed with a computer processor.

In accordance with another aspect of the exemplary embodiment, a system for performing data processing through a pipeline of components includes a learning component which generates an error prediction model which, for a plurality of pipeline components of a pipeline, models a probability of at least one of the plurality of pipeline components committing an error for input data, parameters of the error prediction model being learned using a set of training observations. Each observation includes partial user feedback relating to error in data output by the pipeline for respective input data. Each of the plurality of pipeline components commits errors for at least some of the input data which contributes to an error in the respective output data. An error prediction component is provided. For a new observation for the pipeline, it determines which of the plurality of pipeline components in the pipeline contributed to any error in the data output by the pipeline. The inference is based on the input data for the new observation and the error prediction model. The new observation includes input data and optionally user feedback for the new observation indicating that an error has occurred without specifying which of the pipeline components contributed to the pipeline error. A processor implements the learning component and the error prediction component.

In accordance with another aspect of the exemplary embodiment, a method for performing data processing through a pipeline of components, includes providing an error prediction model in computer memory which models a probability of at least one of a plurality of pipeline components of a pipeline committing an error for input data, parameters of the error prediction model having been learned using a set of training observations, each training observation comprising user feedback relating to error in data output by the pipeline for respective input data, wherein each of the plurality of pipeline components commits errors for at least some of the input data which contributes to an error in the respective output data. Each of the plurality of pipeline components is wrapped in an error module which modifies the output of the respective pipeline component when the error prediction model predicts that the pipeline component has contributed to an error in output data. A new observation for the pipeline is received, the new observation including input data and optionally further including user feedback relating to error in data output by the pipeline for respective input data, the user feedback for the new observation indicating that an error has occurred without specifying which of the plurality of pipeline components contributed to the error. The method further includes determining which of the plurality of pipeline components in the pipeline contributed to the error in the data output by the pipeline, based on the input data for the new observation and the error prediction model. The determining which of the plurality of pipeline components contributed to an error in the data output by the pipeline may be performed with a computer processor.

DETAILED DESCRIPTION

Figure 1:
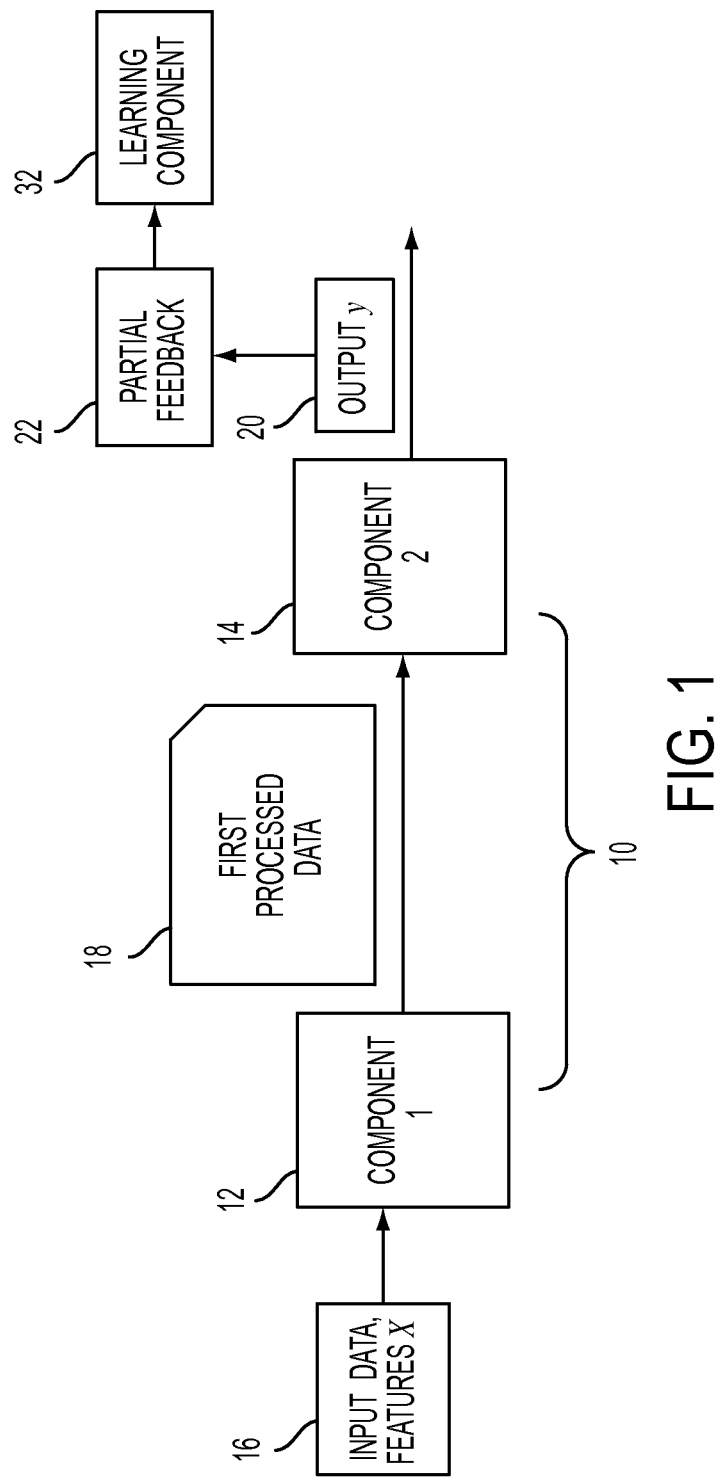
FIG. 1 illustrates a two component pipeline used to generate a system for predicting errors.

Aspects of the exemplary embodiment relate to a system and method for predicting the source of errors in a pipeline comprising a plurality of pipeline components which do not individually report errors. Given user feedback on the final output, the system and method allow predictions to be made as to which pipeline component(s) are the cause(s) of the error, and in some embodiments, to modify the output of the individual pipeline components when the predicted error meets a predefined threshold.

Such a system and method find application in complex web applications, allowing them to be specifically tailored to particular users. Complex applications in web and data processing are often approachable by decomposing the end goal into a series of simpler components in a pipeline of content transformations. As one example, of a pipeline in which the system may be employed, an opinion summarization method may be implemented by a set of pipeline components that each markup or modify the input text in some way, such as by modeling sentiment and extracting aspects. The output is then the final result of aggregating each transformation in the pipeline. User feedback is available with respect to the reliability or accuracy of the output.

In the exemplary embodiment, a learnable component pipeline method is disclosed which is able to incorporate user feedback across some or all of the underlying pipeline components in a standardized way that is easy to use for non-machine learning experts (by modeling the probability of the existing component making an error given the input). The method provides an error prediction model for determining which pipeline component was at fault when the feedback only provides an overall error, i.e., that the system made an error at some indeterminate point in the pipeline.

In one embodiment, each pipeline component in the system is modeled as a set of binary classifiers. For each pipeline component, the probability of that pipeline component committing an error given a particular input is modeled. If the probability is greater than a predefined threshold τ, the prediction for that input may be reversed as compared to what the base pipeline component would have predicted.

Additionally, when users give feedback based on a final output, the feedback may sometimes be specific to a particular pipeline component (e.g., a product review summarization pipeline should output representative sentences that contain opinion; if an output sentence does not contain opinion, it is clear to the user that the opinion module has failed). Conversely, there are other times when an output is poor, and the user can tell that it is poor, but it is not at all clear which module committed the error. For example, many summarization algorithms first run a part-of-speech (POS) tagging module on all sentences and then score sentences with the POS tags as a feature. A poorly performing POS tagging module may be to blame for a weak sentence that was extracted and included in a summary, but a user could not be cognizant of the source of that error. In the exemplary embodiment, a probabilistic approach is used, based on a learned prediction model, that allows the system to make an informed prediction on which pipeline component committed an error (and optionally rectify the problem) given only the input data and, in some embodiments, the fact that a final output was either correct or incorrect.

In some pipelines, the pipeline components may be fixed in that the user is not permitted to modify the internal operations of the pipeline component when an error is observed. Or, modification of the pipeline components themselves may not be desirable to allow the pipeline to be applicable to different contexts. In the exemplary embodiment, this can be addressed by wrapping each of the pipeline components in an error module that automatically corrects the output of the pipeline component when an error is attributed to that pipeline component. Modeling the pipeline as a Bayesian network (see, D. Koller and N. Friedman, "Probabilistic Graphical Models:

Principles and Techniques," MIT Press, 2009), thus requires no changes to any of the underlying pipeline components. Applying a wrapper to base pipeline components allows the probability of them generating user feedback to be used to target the pipeline component that is most likely at fault when an error has occurred. The exemplary error modules thus convert the pipeline into a chain of learnable components, each of them introducing a feedback loop to the corresponding base pipeline component.

The exemplary error prediction model is learned from partial feedback. By "partial feedback" it is meant that the errors are not attributed to the pipeline component(s) responsible for the errors, at least in some cases. The partial feedback can be provided by one or more users via a graphical user interface.

Figure 2:
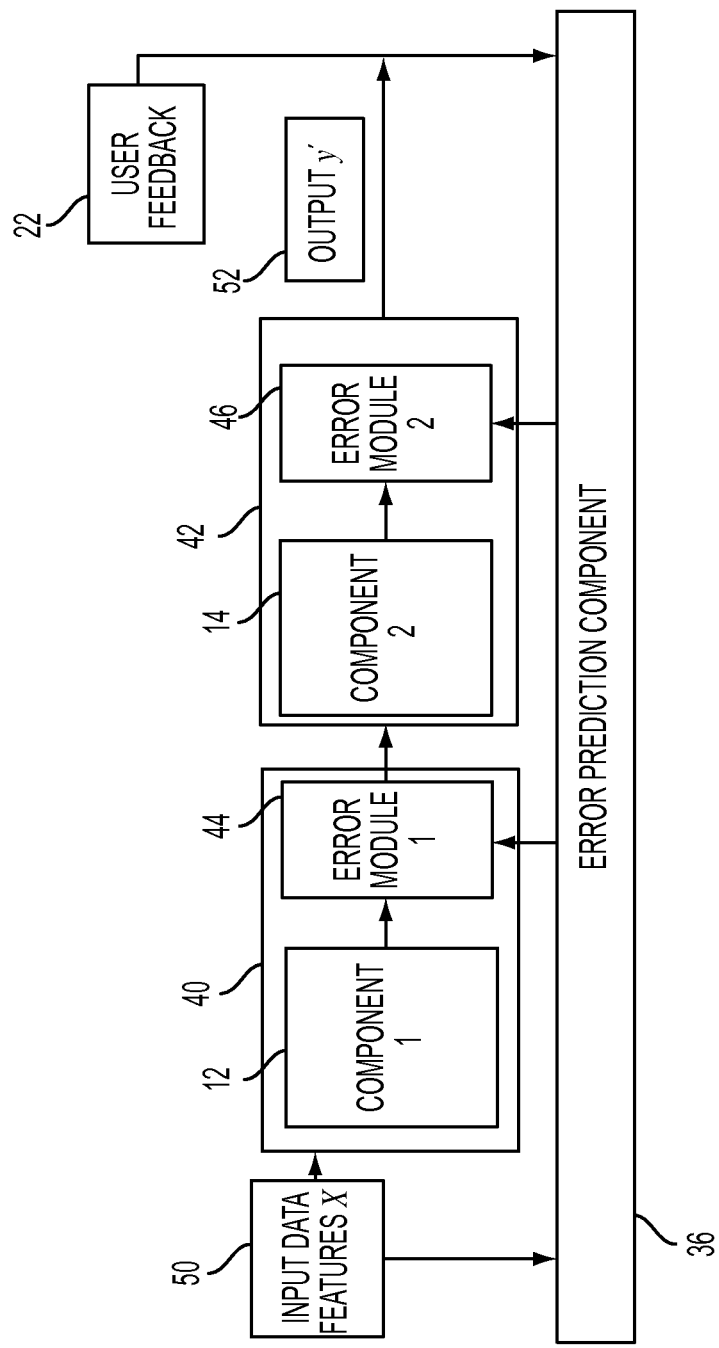
FIG. 2 illustrates a modified two component pipeline.

With reference to FIGS. 1 and 2, an exemplary two-component pipeline 10 is shown which includes a first pipeline component (Component 1) 12 and a second pipeline component (component 2) 14, positioned in the pipeline downstream of pipeline component 1. Input data 16 is received by the first pipeline component 12, which processed the input data and outputs first processed data 18 to the second pipeline component 14. Pipeline component 14 processes the first processed data 18 and outputs second processed data, which in this case is output data 20. As will be appreciated, the pipeline may have more than two pipeline components, such as from 3-10 pipeline components, and each pipeline component may itself be a pipeline of two or more pipeline components. In the case of three (or more) components, for example, a third pipeline component may be position in the pipeline upstream of component 1, intermediate components 1 and 2, or downstream of component 2. At least two of the components 12, 14 in the pipeline are subject to errors. For example, a regular expression filter may not detect misspelled words, a rule-based classifier can make a false decision, or a dictionary-based tagger can encounter out-of-vocabulary words.

In the exemplary embodiment, errors occur in one or more components 12, 14 of the pipeline for one or more data inputs x of a set X of data inputs. Partial feedback 22 relating to error is provided, based on user observations of the output y, which identifies whether or not each output y in the output data (given corresponding input data x) is erroneous. Specifically, for at least some of the observations, the partial user feedback indicates that there is an error in the data output and for others of the observations, the partial user feedback indicates there is no error in the data output.

During training of the exemplary system 30 (shown in FIG. 3), the feedback 22 is received by a learning component 32 of the system 30, which is used to learn parameters of an error prediction model 34. The prediction model is later used by an error prediction component 36 to predict which of the pipeline components 12, 14, is the source of an observed output error, i.e., which contributed to the overall pipeline error. While a single prediction component 36 is illustrated, it is to be appreciated that each pipeline component may have a dedicated prediction component 36. In the exemplary embodiment, the system 30 does not receive feedback from the individual pipeline components 12, 14 themselves at any time, either during training or in prediction, although it is also contemplated that for some, but not all of the training samples, individual pipeline component feedback may also be provided.

The data may be input to the pipeline as a set, e.g., vector, x of one or more features ($x_1, x_2$, etc.). The features can vary, depending on the type of input. For example, where the input data 16 are scalar values or integers, the values themselves or quantized values, can be used as the features. Where the input is received in the form of a text sample, such as a sentence, paragraph, or a bag-of-words representation of the text may be generated. This can be the words or root forms of some or all the words or may be based on a word frequency histogram which counts the occurrences of words from a predefined set of words appearing in the text. The features such as optionally normalized word counts, can be stored in the form of a relatively sparse, multidimensional vector. Other text-based representations are also contemplated which may take into account other aspects of text, such as parts-of-speech, or the like. In the case of translation pipelines, each sentence may be considered as a pipeline, and each phrase in the sentence as a separate component. In this case, the features may be features related to translation scoring, such as lexical and/or phrase-based features. For images as input data, the features can be extracted from patches of the image, e.g., as bag of visual word representations or Fisher vectors, or any other representation which reduces the dimensionality of the input image data. See, for example, U.S. Pub. Nos. 20080069456, 20120076401, and 20120045134, the disclosures of which are incorporated herein by reference in their entireties.

Illustrative pipelines include, but are not limited to Natural Language Processing (NLP) applications, such as named entity recognition (e.g., a pipeline which includes three main pipeline components: a part-of-speech (POS) tagging component, followed by a chunker, followed by a named entity classifier), text summarization, textual entailment recognition, and opinion mining (e.g., using a first pipeline component that filters out comments that do not contain opinion, and a second pipeline component that labels the comments with category labels selected from a predefined set of opinion category labels, such as categories relating to the subject matter of the opinion and/or whether it is positive or negative with respect to the subject). Where a pipeline component does not output a binary output, as in the case of a multi-class classifier, it can be treated as being decomposed into a set of binary sub-components.

As shown in FIG. 2, once the system 30 is trained, each of the pipeline components 12, 14, etc. may be wrapped to form an error adjusted component 40, 42, by adding an error module 44, 46 downstream of each pipeline component 12, 14, respectively. When feedback 22 indicates an error in the output y, the error prediction component 36 identifies which of the pipeline components 12, 14 was the source of the error and instructs the respective error module 44 or 46 to modify the output of the pipeline component predicted to be a source of the error. In one embodiment, the error modules comprise binary classifiers. In some cases, more than one pipeline component may be predicted to be the source of the error, in which case, more than one error module may be instructed. As a consequence, for new input data 50 the system outputs modified output data 52, denoted y'.

With reference once more to FIG. 3, a functional block diagram of an exemplary computer-implemented system 30 is illustrated. The system may be hosted by one or more computing devices 60, such as the illustrated server computer. The illustrated computer system 30 includes a processor 62, which controls the overall operation of the computer system 30 by execution of processing instructions 64 which are stored in memory 66 connected to the processor 62. Computer system 60 also includes a first interface 68 for receiving training data 70 and/or test data 72 and second interface 74 for outputting instructions 76 to the error modules 44, 46. Alternatively, the second interface 70 may communicate with an output device, such as a display device, which identifies to a user, the pipeline components which are predicted to be causing the error and optionally proposing a modified output y'. The various hardware components 62, 66, 68, 74 of the computer 60 may all be communicatively connected by a data/ control bus 78. Feedback 22 may be provided by a user, e.g., via a graphical user interface provided on an associated computing device 78 having a display device 80, such as a computer monitor or LCD screen.

The computing device 60 may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 66 may represent any type of non-transitory computer readable medium such as random access memory (RAM), read only memory (ROM), magnetic disk or tape, optical disk, flash memory, or holographic memory. In one embodiment, the memory 66 comprises a combination of random access memory and read only memory. In some embodiments, the processor 62 and memory 66 may be combined in a single chip. The network interface(s) 68, 74 allow the computer to communicate with other devices via a computer network, such as a local area network (LAN) or wide area network (WAN), or the Internet, and may comprise a modulator/demodulator (MODEM) a router, a cable, and/or Ethernet port. Memory 66 stores instructions 64 for performing the exemplary method as well as the processed data.

The digital processor 62 can be variously embodied, such as by a single-core processor, a dual-core processor (or more generally by a multiple-core processor), a digital processor and cooperating math coprocessor, a digital controller, or the like. The digital processor 62, in addition to controlling the operation of the computer 60, executes the instructions 64 stored in memory 66 for performing the method outlined in FIG. 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The instructions 64 include the learning component 32 and error prediction component 34, discussed above. The learning component receives observations in the form of training data 70. Specifically, for each of a set of data inputs X, which can each be single values, vectors of two or more values, matrices of values, or the like, a corresponding label 22 which indicates whether or not the corresponding output y is erroneous is received. The observations 70 are used to learn the parameters of the prediction model 34. The prediction component 34 uses the learned prediction model 34 for predicting which of the pipeline components 12, 14, etc. was a source of an observed error, when there is one, for the new observation 72. An output component 82 outputs the instructions 76 to the subset of the error modules 44, 46 that are associated with a pipeline component which has been predicted to have committed an error, or outputs other information based on the prediction output by the error prediction component 36. As will be appreciated, once the system 30 has been trained for a particular pipeline application, and parameters of the error prediction model 34 have been stored in memory, the learning component 32 can be omitted. In another embodiment, separate computer devices are used for training the prediction model 34 and for using the trained prediction model to predict sources of errors in the pipeline.

Figure 3:
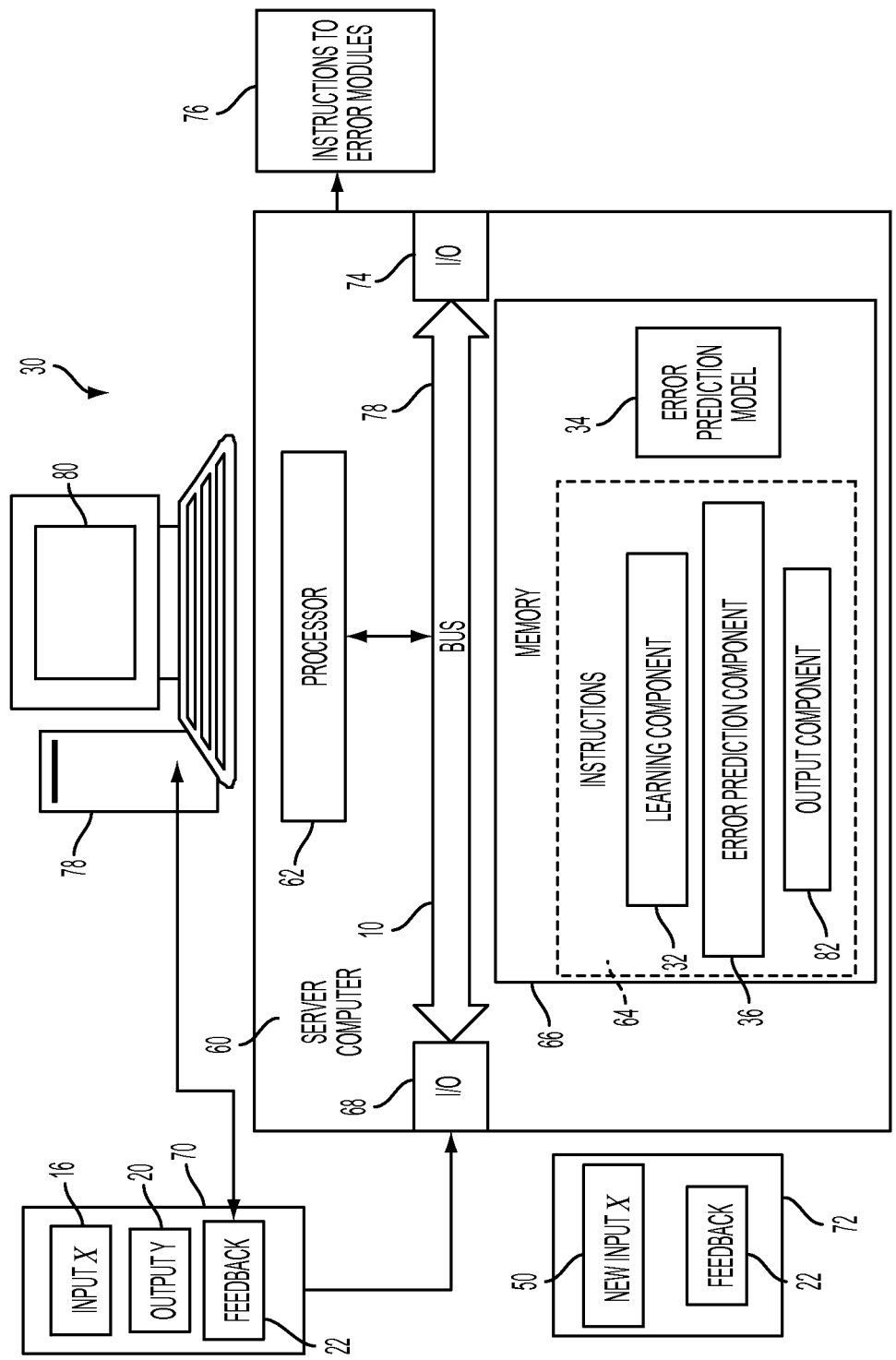
FIG. 3 illustrates a system for error prediction based on partial feedback.

As will be appreciated, FIG. 3 is a high level functional block diagram of only a portion of the components which are incorporated into a computer system 30. Since the configuration and operation of programmable computers are well known, they will not be described further.

Figure 4:
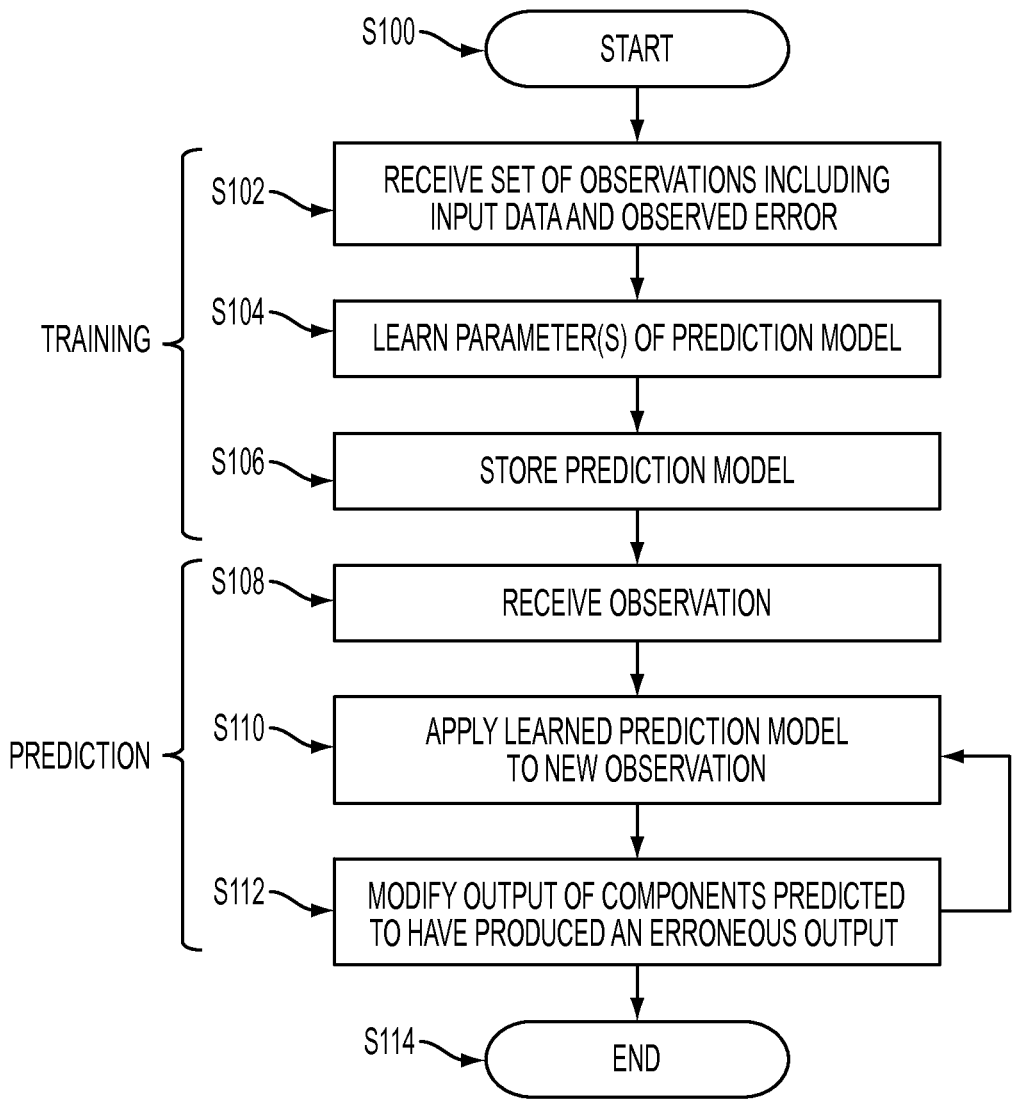
FIG. 4 illustrates a method for error prediction based on partial feedback.

FIG. 4 illustrates a computer-implemented method for training a probabilistic model and using the trained model to predict errors in pipeline components 12, 14 which may be performed with the system of FIGS. 1-3. The method begins at S100.

At S102, a set of observations is received for a selected pipeline 10 and stored in memory, each observation including input data 16 and information 22 identifying an error status (e.g., a binary decision corresponding to error or lack of error) for the respective output data 20.

At S104, parameter(s) β of an error prediction model 34 is/are learned, by the learning component 32. In particular features are extracted from the input data and parameters for are learned for each pipeline component, one for each feature. There may be a single prediction model 34 generated for all the pipeline components or a respective prediction model 34 for each pipeline component. The model parameters β may be learned through a maximum likelihood framework using, for example, batch/stochastic gradient descent or Expectation Maximization for a more generic approach as the number of pipeline components increases, or, where the number of pipeline components is large enough to render exact inference intractable, an approximate inference technique based on variational methods or sampling.

At S106, once sufficient observations have been obtained for the prediction model to have a desired expected accuracy, which can be, for example, about 200 to 500 observations, depending on the number of pipeline components and the type of outputs, the learned prediction model 34 is stored in memory 64. This ends the learning phase.

At S108, a new observation 74 is received which includes input data 50 and may also include information 22 identifying error in the respective output data 20.

At S110, the learned prediction model 34 is applied to the new observation 74 by the error prediction component 36, using the learned prediction model 36 to identify component(s) of the pipeline 10 which is/are predicted to be the source of any error in the output data (either predicted or observed). For example, a threshold may be set on the predicted error. If the probability of error in one of the pipeline components is at or above the threshold, the prediction component 36 assigns an error to that pipeline component.

At S112, an action is taken when an error is predicted to have occurred in one of the components, i.e., based on the predicted error being at or above the threshold. In one embodiment, the error modules of the erroneous pipeline components are notified and requested to modify the respective output 18, 20. The output of the pipeline component(s) that is/are predicted to have produced an erroneous output is/are modified by the respective error module(s) and a modified output 52 is generated by the pipeline. This may result in the wrapped component providing the alternate prediction in binary classification, the next most likely prediction in multiclass classification, or another appropriate action given the task and the pipeline component type.

The output 52 may be substituted for output 20 and stored in memory of the system or memory associated with the pipeline. The method may return to S108 when the next observation is received.

The method ends at S114.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 60, (for example, an internal hard drive of RAM), or may be separate (for example, an external hard drive operatively connected with the computer 60), or may be separate and accessed via a digital data network such as a local area network (LAN) or the Internet (for example, as a redundant array of inexpensive of independent disks (RAID) or other network server storage that is indirectly accessed by the computer 60, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement all or part of the method. As will be appreciated, while the steps of the method may all be computer implemented, in some embodiments one or more of the steps may be at least partially performed manually.

Figure 5:
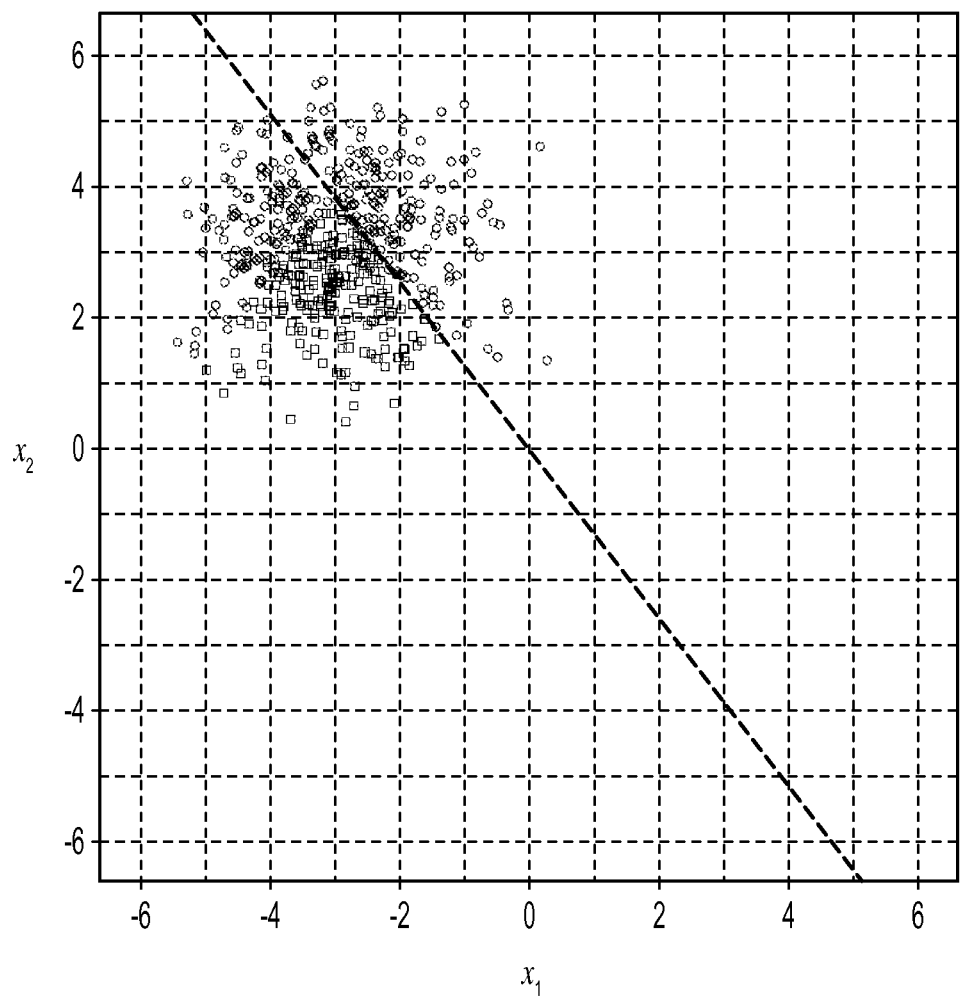
FIG. 5 illustrates input data $\chi=(x_1,x_2)\in \mathbb{R}^2$, where □ represents the feedback f=0 (no error) and ○ represents the partial feedback f=1 (error in one or more of the pipeline components) and a linear predictor of error for $\mathcal{T}$.
Figure 6:
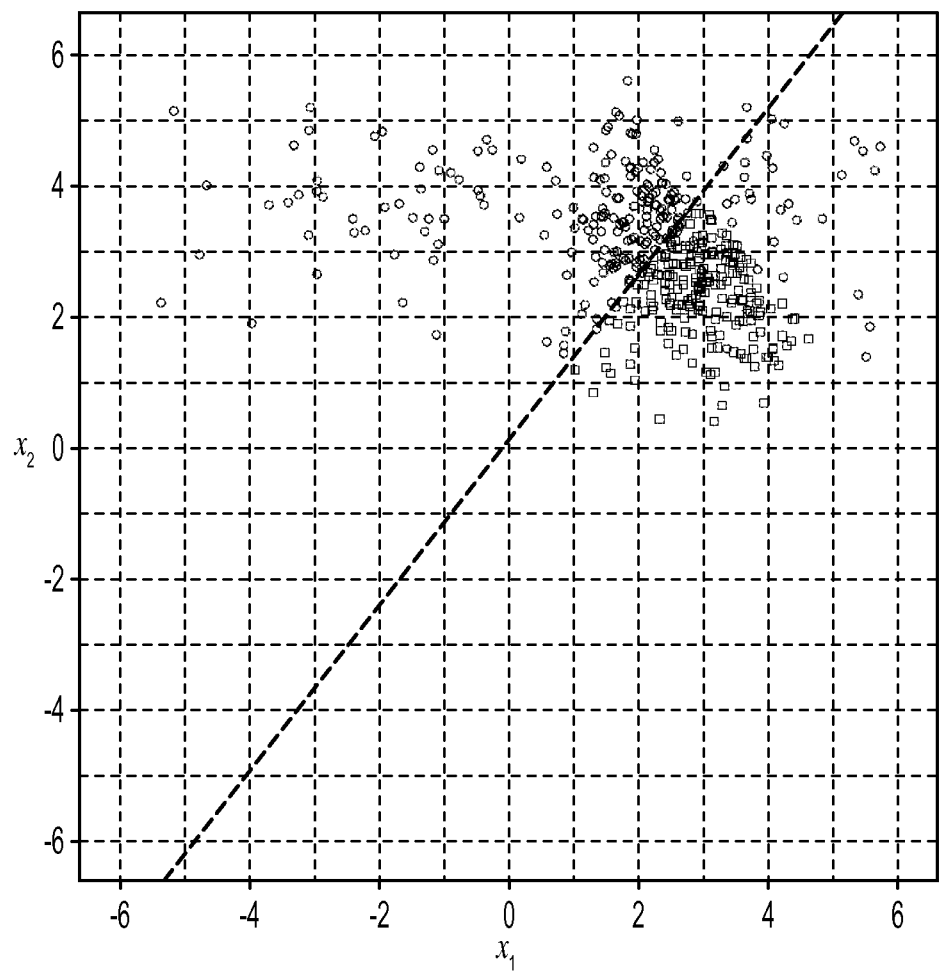
FIG. 6 illustrates translation of the input data in FIG. 5 by $\mathcal{T}$ and a linear predictor of error for $\mathcal{T}$.
Figure 7:
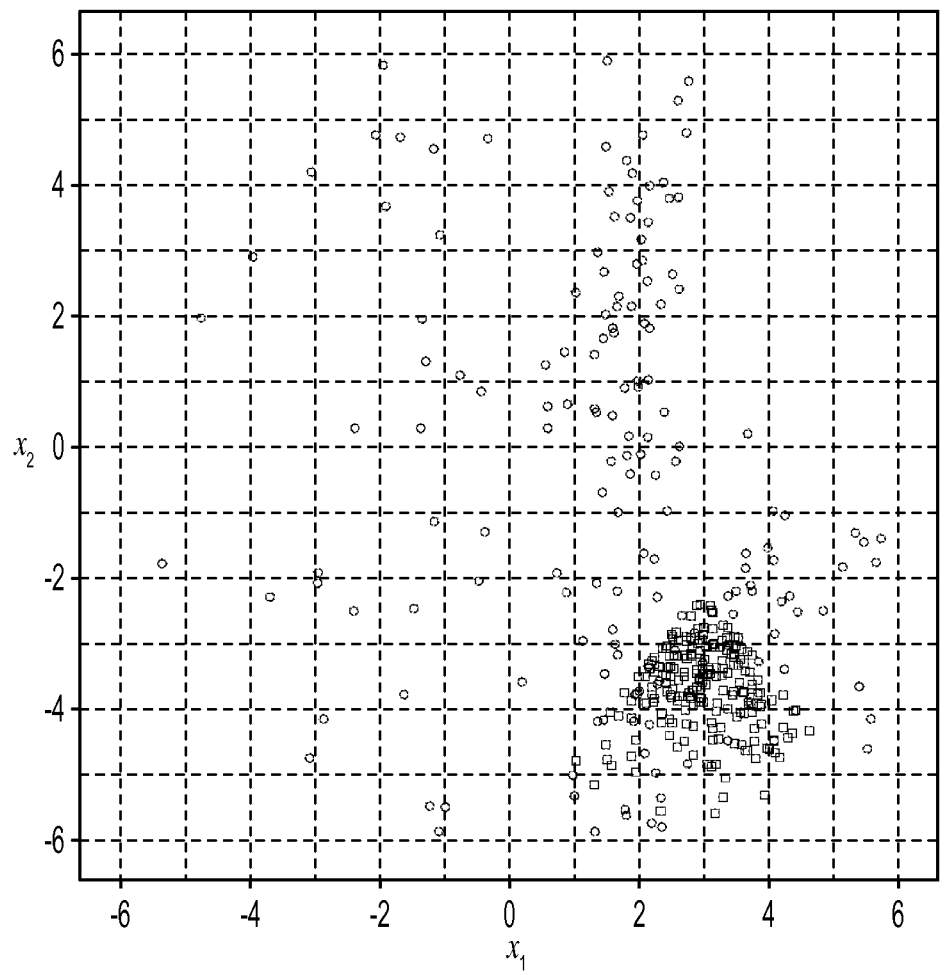
FIG. 7 illustrates translation of the data in FIG. 6 by $\mathcal{T}$.

As a simplified example of a pipeline, FIGS. 5-7 visualize a set of input data $X=(x_1, x_2) \in \mathbb{R}^2$ (input, FIG. 5) running through two affine transformation components 12, 14 in a pipeline 10. The first pipeline component 12 translates the data by $\mathcal{T} = x_1 + 6$, (FIG. 6) and the second pipeline component 14 translates the output of the first component by $\mathcal{T} = x_2 - 6$ (FIG. 7). However, each of the components 12, 14 has some region where the component commits errors.

In this simplified example, an error by one of the translation components 12, 14 causes the respective translation to be distorted by scaling it by uniform noise. Since the user only observes the final output (FIG. 7), there are two classes of partial feedback 22: $f_i=0$ means that for point $X_i$, the data transformations were successful and no errors occurred; $f_i=1$, on the other hand, means that there was some error, though it is not clear whether it was the result of the first component committing an error, the second component committing an error, or both.

The user is generally able to identify an overall error much more efficiently than having to specify its source. With K components, full feedback would require selecting from $2^K-1$ distinct configurations of error. In many cases, it may be difficult, if not impossible for a user to identify the source of error. In a Named Entity Recognition pipeline that includes a part-of-speech (POS) tagging component, followed by a chunker, followed by a named entity classifier, an incorrectly identified named entity can easily be spotted in the output, but the user may not be able to identify whether it was the POS tagger, the chunker, or the classifier that was the root cause of the error.

For illustrative purposes only, the incorrectly translated output data points have been identified as circles and the error-free data points as squares for the input, intermediate, and final results. In FIGS. 5 and 6, the component-specific linear error predictor is also plotted. Knowing this relationship, the prior probability of a component committing an error given some input can be predicted, and the posterior probability of the error configuration can be predicted, given that an error has been observed. In some embodiments, corrective measures can be taken by directing training data to the component at fault. In the exemplary embodiment, however, the system automatically attempts to rectify the error through a component wrapper 40, 42.

A probabilistic framework is disclosed herein that aims to uncover the predictors of error for each of the arbitrary number of components in a data processing pipeline 10, and predict the configuration of error for each data observation. In the exemplary embodiment, an error configuration indicates for each component, whether the component is predicted to have produced an error in generating its output, based on the input it receives, e.g., a scalar value of 0-1, or a binary value of 1 if it meets the error threshold, 0 otherwise. An exemplary probabilistic model 34 useful herein is based on binary classification of error through logistic regression. In one embodiment, an Expectation Maximization (EM)-based algorithm is used to learn component-specific error prediction model parameters and to estimate the configuration of error. The accuracy of the method is demonstrated in the Examples below on synthetic data, and on two real-world tasks: a two-component opinion summarization pipeline and a phrase error prediction task for post-editing in machine translation.

Eliciting User Feedback (S102)

Figure 9:
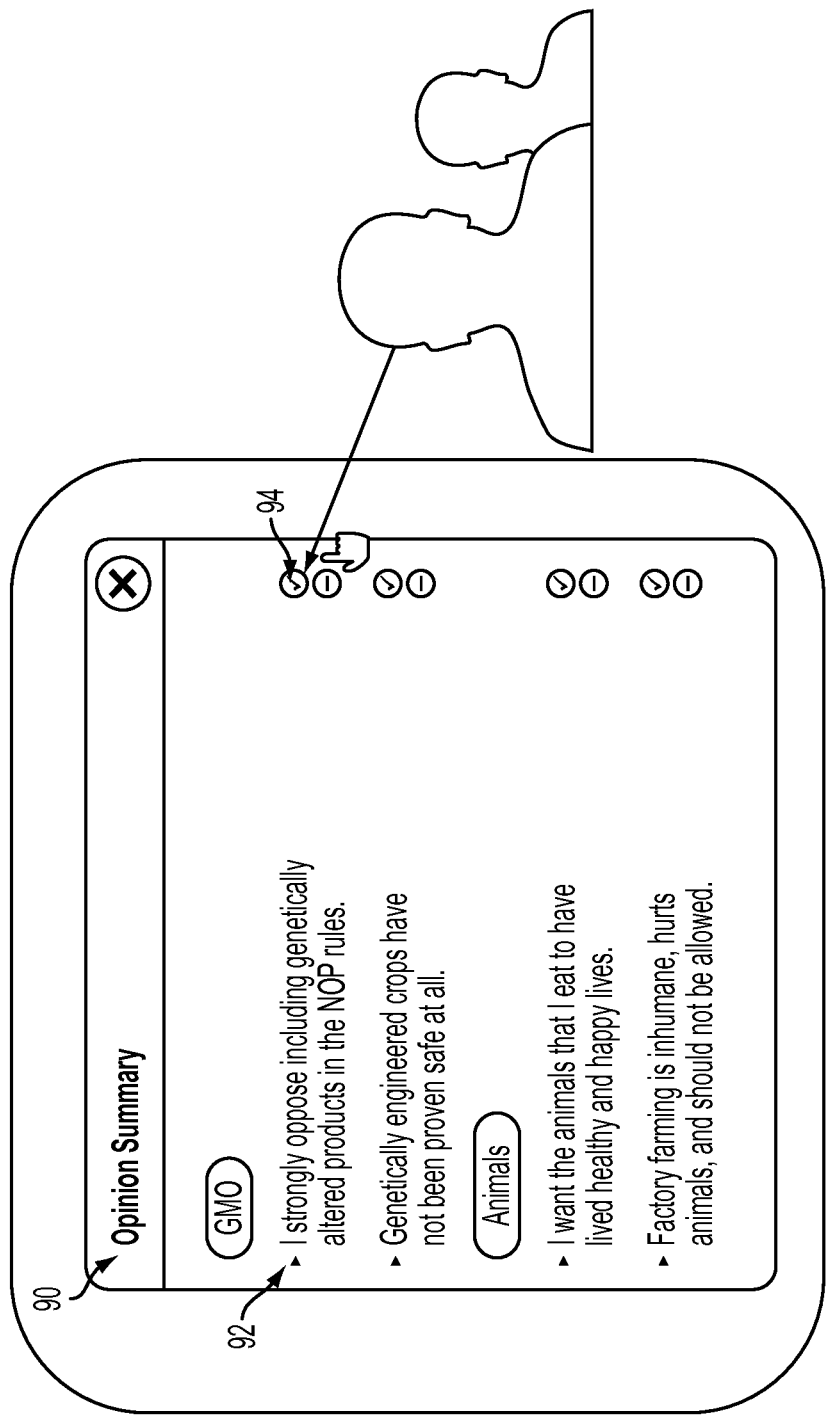
FIG. 9 illustrates that an exemplary user interface.

An exemplary graphical user interface 90 which may be displayed on the display device 80, is shown in FIG. 9. It is assumed here that the pipeline is a two-component summarization system (the first component determining whether or not the input text contains opinion; the second determining, for each of K aspects or categories, whether the text can be associated with a particular category label). A summary visualization 92 displays a text sample under a category heading only if it was determined by the pipeline to both contain opinionated text and be associated with that category. The first base component may be a simple binary decision function that returns whether the words of the sentence came from a pre-defined dictionary of English words. For the second base component, a topic model automatically creates categories of sentences when the interface is run the first time.

In a labeling mode, illustrated in FIG. 9, the user gives partial feedback 22 by stating whether a given sentence either contains opinion and is in the correct category (f=0), or that one or both of these is incorrect (f=1), by using a user input mechanism 94 (here, clicking on the check mark or cross icon).

In one embodiment, all examples output by the pipeline (or a randomly selected subset of them) are presented to the user for evaluation in a training phase. In another embodiment, active learning techniques are employed to choose which examples to show to the user. This can reduce the amount of feedback to be provided by the user for a same level of accuracy by choosing examples to provide feedback on, e.g. by identifying examples where the current system predicts an error that is close to the threshold.

Once the training phase is complete, the partial user feedback is no longer needed, although it may be beneficial to have, so that the error model is employed only when the partial feedback indicates an error in the output.

The Prediction Model 34

For each component n in a pipeline processing system 10, the probability $p(e_n=1|x,\beta)$ that it will commit an error $e_n$ given input x can be modeled as a Bernoulli random variable, modeled using logistic regression, such as a binary logistic regression, as follows:

$$p(e_n=1|x,\beta)=\sigma(\phi_n(x)^T\beta) \quad (1)$$

where $\sigma(.)$ is the logistic function, T represents the transpose operator, $\beta$ represents learned parameters of the model 34 (for that component), and $\phi_n(.)$ is a function that extracts the features that are relevant for a respective component n, i.e., $\phi_n(x)$ represents the set of features which component n uses to compute its output. The relevant features for a given component may be extracted from the input features in x, for example, different components may use different ones of the input features, or may be extracted from the output of an earlier component in the pipeline.

The exemplary logistic function takes the form:

$$\sigma(\phi_n(x)^T\beta) = \frac{1}{(1+e^{-\phi_n(x)^T\beta})} \quad (2)$$

Thus, by extracting features from a given input x and inputting the relevant extracted features $\phi_n(x)$ and the parameters $\beta$ for a given component n into Eqn. 2, the probability for that component being an error is output in the range of 0-1. As will be appreciated, there are other ways to model binary classification, such as with support vector machines (SVM) but they tend to be more complex and not necessarily needed for this type of application. In practice, the logistic function provides a simple binary classification model which works well and fits the problem.

While $\beta$ can be considered as $\beta_n$, since different components may have different associated parameters, the set of all parameters for all components can be implemented by a single vector or matrix, as discussed below, so $\beta$ can refer to the learned parameters for a single component or all components.

It is assumed that the system 30 only has access to partial feedback; that is, the only error observation, f, is with respect to the aggregate error. In this case, a user provides feedback 22 only pertaining to whether some error occurred in an indeterminate set of components (f=1), or that the output contains no errors at all (f=0).

Let $e=(e_1, \ldots e_N)$ be the collection of error random variables, one error variable for each component (e.g., each $e_i=\{0,1\}$), such that the probability of observation f and a given set e of errors is a product of two terms:

$$p(f,e|x,\beta)=p(e|x,\beta)p(f|e) \quad (3)$$

where the first term $p(e|x,\beta)$ contains the probability of a given error configuration e, and the second term $p(f|e)$ encodes how the user feedback f relates to the error configuration. In the general case of the first term of Eqn. 3, this can be expressed as a product, over all the components, of the probability that that component has an error, given the input x and parameters $\beta$:

$$p(e|x,\beta)=\Pi_{i=1}^N p(e_i|x,\beta) \quad (4)$$

This assumes the probability of one component committing an error is independent of the errors of the other components. For the second term in Eqn. 3, the standard case where 1 or more errors committed in the components leads to an observed final error f=1, the probability that the final error is 1 is a function of a sum the component errors: $p(f=1|e)=\delta(\Sigma_i e_i)$, where $\delta(\Sigma_i e_i)$ is the delta operator which returns 1 if the argument (the sum of the e's) is greater than 0 and returns 0 if the argument is equal to 0, and the probability that the final error is 0 is also a function of the sum of all the errors: $p(f=0|e)=1-p(f=1|e)=1-\delta(\Sigma_i e_i)$, where $\delta(\Sigma_i e_i)=1$ if $\Sigma_i e_i > 0$ and $\delta(z\Sigma_i e_i)=0$ otherwise. This embodiment assumes that the error configuration is modeled as having values of 0 or 1 for each component. It is also contemplated that this term could be modeled more intricately by allowing a user to specify a degree of error or by leading the model in the general direction of error(s) without having to explicitly report them.

Since all errors are assumed to be conditionally independent, given the input x, i.e., $p(e|x,\beta)=p(e_1, \ldots, e_N|x,\beta)=\Pi_{i=1}^N p(e_i|x,\beta)$ and the posterior probabilities of error are 0 when the observation f is 0 (no error in the output) and a function of a product of the regression function, the extracted features used by that component, and $\beta$ value(s) of each component when an output error is observed, then:

$$p(e|f,x,\beta) = \begin{cases} \delta(e_i=0, \ldots, e_n=0) & \text{if } f=0, \\ \text{and} \\ \frac{\prod_{i=1}^N \sigma((2e_i-1)\phi_i(x)^T\beta)}{1-\prod_{i=1}^N \sigma(-\phi_i(x)^T\beta)} & \text{if } f=1 \end{cases} \quad (5)$$

The term $2e_1-1$ is equal to 1 when $e_i=1$ and equal to $-1$ when $e_i=0$. The probability of $e_i=1$ is modeled as $\phi_i(x)^T\beta$ and because of the properties of the sigma function, the probability of $e_i=0$ is the same with a negative argument.

Thus, once parameters $\beta$ have been learned, the probability that a given component is in error for a given input can be computed according to Eqn. 2. If the probability value exceeds a predetermined threshold, which may be the same or different for each component, that component is assigned an error for the input data.

Figure 8:
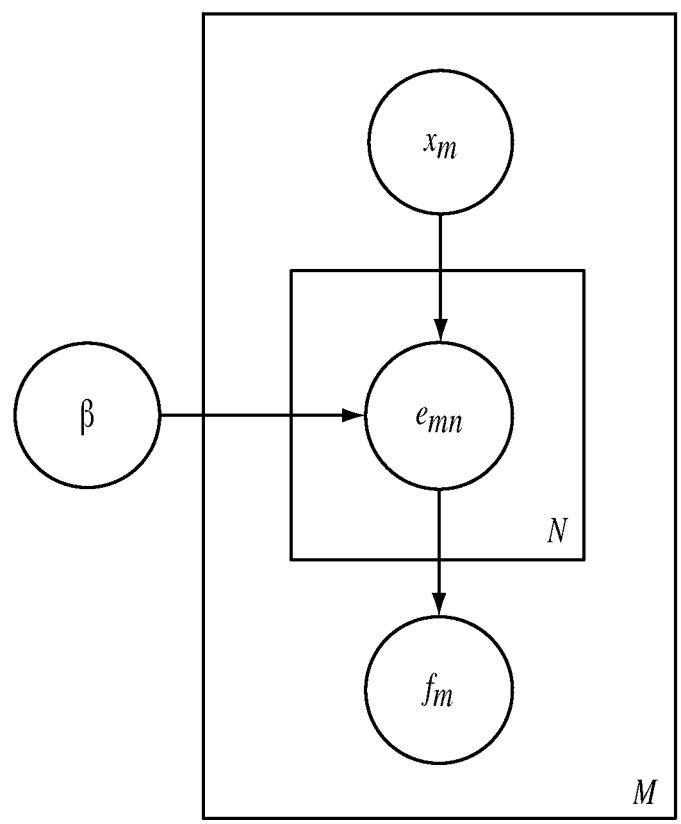
FIG. 8 is a graphical model of the error prediction framework, where there are M observations and N pipeline components in the pipeline and β is a vector parameter of the component error models.

A graphical model depiction of the error prediction model framework is shown in FIG. 8, for a case where there are M observations and N components of the pipeline.

4. Parameter Estimation (S104)

The component-specific error prediction model parameters $\beta$ can be learned by maximizing the likelihood which is obtained by integrating out the latent error variables $e_i$. The likelihood and its derivative can be computed in closed form and the parameters then optimized using gradient descent. See, for example, Bottou, L.: "Large-scale machine learning with stochastic gradient descent," in Lechevallier, Y., Saporta, G., eds., Proc. 19th Intern'l Conf. on Computational Statistics (COMPSTAT'2010), pp. 177-187 (August 2010), for a discussion of the gradient descent technique. Rather than trying to optimize the parameters using all of the observations at once, this method randomly draws observations and modifies the parameters incrementally, based on whether the current parameters are in agreement with the observation.

However, as the number of components grows, the terms in the gradient and the likelihood grow unwieldy. Thus, at least in the case of pipelines with a large numbers of components (e.g., at least four or five), other approaches to parameter estimation are contemplated.

For example, in one embodiment, the error estimation and parameter learning are decomposed by using a stochastic EM-based approach. A discussion of this method is found, for example, in Liang, P., Klein, D., "Online EM for unsupervised models," Proc. Human Language Technologies, 2009 Annual Conf. of the North American Chapter of the Association for Computational Linguistics. NAACL '09, ACL pp. 611-619 (2009).

In this method, where there are M observations and N components, the log likelihood is a sum over all observations m=1 to M of the log of the sum over all components of the probability of observation error $f_m$ and a given error configuration value for that component, given the input $x_m$ and parameters $\beta$.

$$\ln \mathcal{L} = \ell(\beta) \quad (6)$$

$$= \sum_{m=1}^{M} \ln \sum_{e_i} \ldots \sum_{e_N} p(f_m, e_i, \ldots, e_N | x_m, \beta)$$

$$= \sum_{m=1}^{M} \ln \sum_{e} p(f_m, e | x_m, \beta)$$

which includes the log of a sum of probabilities over all error configurations. By Jensen's inequality, however, $$\ell(\beta) = \sum_{m=1}^{M} \ln \sum_{e \in \mathbf{e}} p(f_m, e | x_m, \beta) \quad (7)$$

$$\geq \sum_{m=1}^{M} \sum_{e \in \mathbf{e}} w_{m,e} \ln p(f_m, e | x_m, \beta) + H(w_m)$$

$$= g(w, \beta)$$

where the function g represents the function to be maximized, which is a lower bound for the log likelihood. Therefore, if this function is maximized, then this also maximizes the log likelihood. $w_m$ contains a non-negative weight for each configuration of errors e (the size of this set is $2^N-1$), $\Sigma_{e \in \{e \setminus e_0 \ldots 0\}} w_{m,e} = 1$, and for all permutations e, $w_{m,e} \geq 0$. $g(w,\beta)$ is then a lower bound for the log likelihood. $H(w_m)$ is the entropy of weight $w_m$.

Because $g(w,\beta)$ is a lower bound for the log likelihood, maximizing $g(w,\beta)$ will also maximize $l(\beta)$. However, since the latent parameters w are not yet known, the expectation maximization method proceeds by iteratively maximizing w in an expectation step (E-step), with current parameters $\beta$ fixed, and then maximization of parameters $\beta$ in a maximization step, with current weights w fixed (M-step).

E-Step

This may proceed as follows:

Where $e \in \mathbf{e}$ is one of the $2^N-1$ permutations of $e_1 e_2 \ldots e_N$ when there is at least one error in the pipeline then, for each observation m, the latent parameters w are computed as a function of the probability of the observation's value of f and the error configuration for that observation, which may be normalized by taking into account the respective probabilities of all other error configurations e' as follows:

$$w_{m,e} = \frac{p(f_m, e = e | x_m, \beta)}{\sum_{e' \in \mathbf{e}} p(f_m, e = e' | x_m, \beta)} \quad (8)$$

Therefore, for the example where there are N=3 components in an observation, there will be $2^3-1=7$ w's, one for each configuration of error ($e_1$; $e_2$; $e_3$):$w_{001}, w_{010}, w_{100}, w_{110}, w_{101}$, and $w_{011}$ (where the 1's indicate an error for that component and the 0's indicate no error). Each w is a weight in the sense that it represents the probability of the given error configuration. For observations where there is no error, i.e., when f=0, the corresponding weight $w_{0,\ldots 0}=1$.

As will be appreciated, as the number of components increases, the number of values of w increases exponentially. This exponential increase in error combinations can be managed for a moderate numbers of components, such as from 1-5 components, which is reasonable for many applications. For large numbers of components, such as for at least five or at least six components, an approximate E-step may be derived using a variational EM algorithm.

M-Step

The M-step is a weighted maximum likelihood of the following:

$$g(w, \beta) = \sum_{m=1}^{M} \sum_{e \in \mathbf{e}} w_{m,e} \ln p(f_m, e | x_m, \beta) = \quad (9)$$

$$\sum_{m=1}^{M} \sum_{e \in \mathbf{e}} w_{m,e} \sum_{i=1}^{N} [e_i \ln \sigma(\phi_i(x_m)^T \beta) + (1 - e_i) \ln(1 - \sigma(\phi_i(x_m)^T \beta))]$$

where each $e_i$ takes a value assigned by the permutation indexed by e. For example, if N=2, then:

$e=(e_1,e_2)=\{1:(0,1); 2:(1,0); 3:(1,1); 4:(0,0)\}$.

Therefore, each observation m with $f_m=1$ requires three $w_{m,e}$ calculations, where $e_i$ has a value of 1, 2, and 3, respectively, and contributes 3 weighted samples to the maximum likelihood.

In the E step, therefore, the most likely configuration of the errors, given the parameters currently estimated, is computed. For example, if the current error model parameters predict 70% chance of error for component 1 and 75% change of error for component 2, then the E-step predicts that there will be a high chance of the configuration (1,1) (error, error) and a low chance of (0,0) (no error, no error). There will be a bit higher chance of (0,1) than (1,0) because the probability (given the current error model parameters) of component 1 having an error is a little lower than for the second. This step has computed the probabilities for each of the $2^n$ components. Then, given that information, the M-step can compute, given the current value of the weights w (learned in the E-step), what are the most likely values for the parameters. In keeping with EM theory, it is expected that this approach will increase the likelihood of the model on each iteration.

It is to be appreciated that $\beta$ will generally be different for each component, which adds further complexity. As noted above, this issue can be avoided by having each feature vector $\phi_i(x)$ be of size D×N, where there are D features for each of the N components, and by placing zeros for the components that align with $\beta$ values not considered by this component. A dot product between a sparse feature vector and the parameters that pertain to the given component can then be efficiently computed. For the M-step, a small number of iterations of stochastic gradient descent (SGD) or batch gradient descent can be run (depending on the application) at each step.

EM algorithms are often highly sensitive to how the parameters are initialized (see, for example. Fayyad, U., Reina, C., Bradley, P. S., "Initialization of iterative refinement clustering algorithms," Proc. Fourth Intern'l Conf. on Knowledge Discovery and Data Mining, pp. 194-198 (1998). In the present case, the parameters can be initialized to avoid falling into local minima for certain initializations. In particular, this problem can be overcome by initializing the model parameters to those obtained by running an independent logistic regression with the observed labels being the overall feedback for the entire pipeline. In other words, for observation $\chi$ with a 2-component pipeline, an initial value $\beta_i$ for component i is learned with features $\phi_i(\chi)$ and label f, even though f=1 is partial as it could imply any of the following configurations: ($e_1=1; e_2=0$); ($e_1=0; e_2=1$); ($e_1=1; e_2=1$). This initialization appears to be able to discourage local minima that could trap the algorithm with a random initialization.

Learnable Components

In the embodiment of FIG. 2, at least a subset of the pipeline base components 12, 14, etc., are replaced by learnable equivalents 40, 42, i.e. functions taking the same input, producing the same output, but also having another input that corresponds to labeled (input, output) pairs. Learning methods for the learnable components 40, 42 may include supervised classifiers, structured output models, regression models, or the like. An advantage of this embodiment is that it provides a generic way to perform the static-to-learnable transformation, by automatically choosing the appropriate learning algorithm according to the type of base component, and keeping track of the origin of each learnable component so that training data can be added to the appropriate learnable component. The choice of the algorithm can be made by identifying the input and output types. For example, if the input is vectorial and the output is binary, the selected learnable component may be a binary classifier. If the output is a real number, the learnable component can be a regression function. For multiple binary outputs in sequences, the algorithm may be a conditional random field, etc.

As an example, consider the case where the pipeline is a structured opinion summarization system with two main components as discussed for FIG. 9. By transforming these components from static to learnable, the sentence filter and the topic model can be transformed into a set of K+1 supervised binary classifiers (1 for the filter plus K for the multi-label classifier) that gradually improve with user feedback. For the summarization example, a two-stage pipeline includes K+1 binary classifiers: one for filtering relevant sentences, the other K to label them as members of K categories.

The user feedback examples 22 are used as labeled data to train the logistic regression classifiers and then, the next time that the pipeline is run, the error modules 44, 46 serve as wrappers for the base components. If the probability of a base component 12, 14 committing an error is high given the input, the output is captured and replaced with the opposite output. If, on the other hand, the probability of error is predicted to be low, the system allows the output given by the base component. In the case of a multiclass classifier, the next most probable label (based on the classifier probabilities) may be output when the system determines a given component is in error, or some other output based on a learned prediction model. The underlying pipeline and its methods, as shown in FIG. 1, do not have to be adjusted as they are simply wrapped with the error modules.

Without intending to limit the scope exemplary embodiment, the following Examples are illustrative of the application of the exemplary system and method.

EXAMPLES

The exemplary method is illustrated with three separate tasks. First, the model and inference algorithm are shown to be applicable by learning the error configuration and model parameters on synthetic data for different lengths of pipelines and numbers of feedback observations. Then results are shown on improving a two-stage opinion summarization system by learning the probability of two static components committing an error, given partial feedback. Finally, results of a semi-synthetic experiment on phrase error prediction for post-editing in machine translation are shown, where the phrases most likely to contain translation errors are predicted, given that it is known that there is some error in the translation.

Example 1

Synthetic Data

Synthetic Data Experiment 1

To demonstrate how the prediction model is able to learn the probability of a component committing an error with access only to partial feedback, the exemplary N=2 component example illustrated in FIGS. 5-7 is employed. In this example, up to M=500 datapoints are drawn with d=2 features ($x_1, x_2$) from a multivariate normal distribution with mean $\mu=(-3,3)$ and standard deviation $\Sigma=II_2$. A true $\beta$ parameter is randomly selected for each component which corresponds to what the system should learn. An error matrix E $\in \{0,1\}^{M \times N}$ is generated where $e_{m,n}=1$ implies that $\phi_n(x_m)$ would result in an error for component n. Each element $e_{m,n}$ is computed by drawing a random Bernoulli variable with parameter modeled by a binary logistic regression resulting in data with some added noise. This tends to result in a dataset that is roughly balanced between $f_m=0$ and $f_m=1$ observations. The translation $T_n$ is applied for point $x_m$ if $e_{m,n}$=Bernoulli($\sigma$ ($\phi_n(x_m)^T\beta$))=0, otherwise the translation is scaled by some noise and the data gets translated randomly. The observations are then $(x_m, f_m)_{m=1}^{M}$ where $f_m=1$ if any of $e_{m,n}=1$ and $f_m=0$ otherwise. Before proceeding, all $e_{m,n}$ are removed and the algorithm learns $\beta$ (and eventually $e_{m,n}$) given only $x_{m,n}$ and $f_m$.

Figure 10:
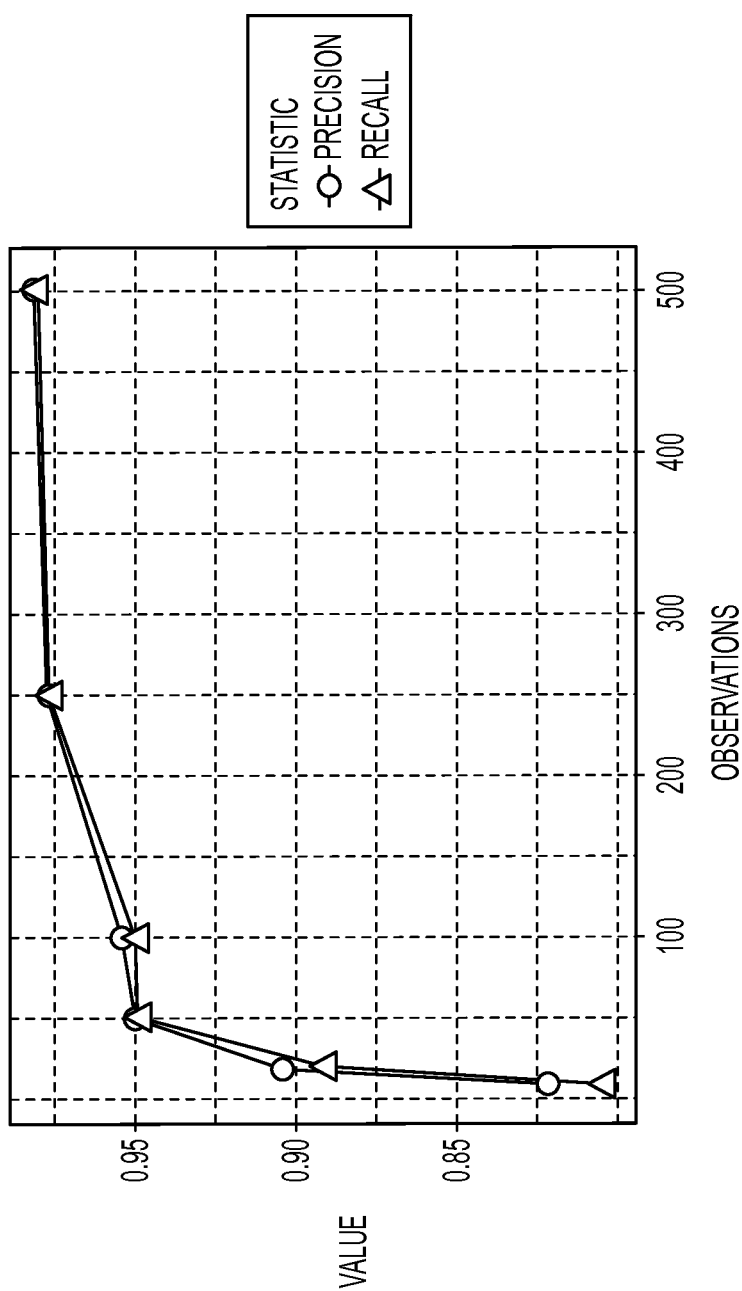
FIG. 10 illustrates precision and recall values for synthetic data experiment 1.

The parameters are learned with varying numbers of error observations and then the precision and recall of predicted prior probability of error are tested on a separate test set of 500 observations drawn from the same distribution. For each number of observations (10 to 500), 5 trials are run. The average precision and recall values are shown in FIG. 10. The results indicate that that the method performs very well even from very few observations and that predictions are almost perfect from 250 observations on.

Synthetic Data Experiment 2

Figure 11:
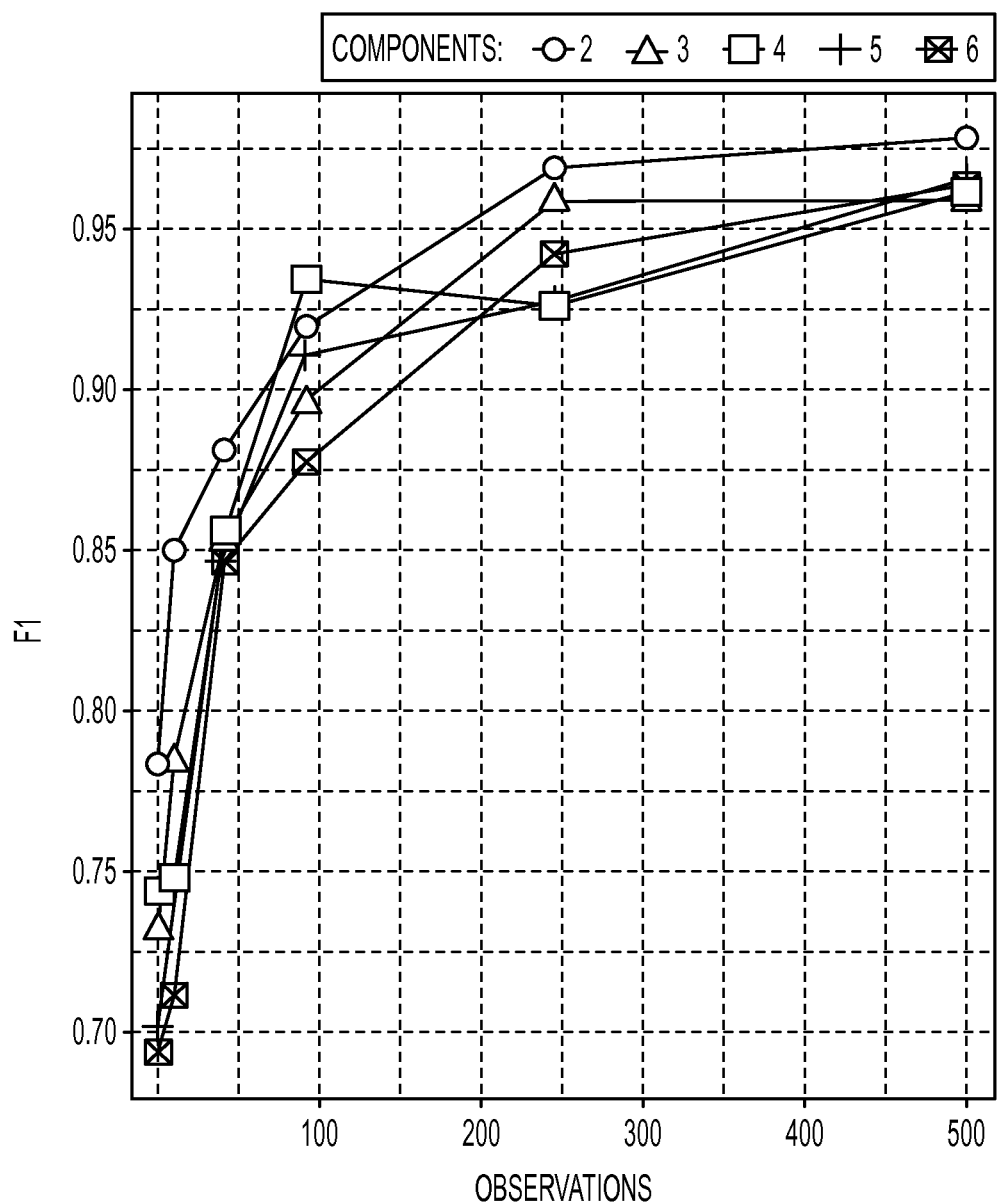
FIG. 11 illustrates precision and recall values for synthetic data experiment 2.

The precision and recall statistics for another synthetic experiment were obtained to evaluate how the model performs as the number of components varies. Here, to simplify things, independent features are drawn for each component from a standard multivariate normal distribution. Error parameters are selected randomly and ground truth labels generated. The algorithm then observes the features and only the partial feedback f for each observation. The object is to determine how many observations are required for different lengths of processing pipelines (from N=2 to N=6 components). For testing, data is again drawn from the same distribution but with M=100 observations; this will amount to MN values of $e_i$ to be predicted. F1-scores for different lengths of pipelines as the number of observations grows are shown in FIG. 11. This shows that for up to 6 components, the error prediction model parameters can be learned very easily with relatively few observation examples. Also, the number of required observations for good predictive performance does not seem to depend heavily on the number of components, at least for the moderate numbers of components tested here.

Example 2

Opinion Summarization

In this example, a simple 2-component deterministic opinion summarization system was used that is input with comments (text samples). This pipeline first filters out comments that do not contain opinion (a binary filter), and then labels the comments with up to K category labels (in the seconds component). For determining opinionated texts, a lexicon of opinion-related words was used, known as the Multi-Perspective Question Answering (MPQA) Subjectivity Lexicon. (See, Wilson, T., Wiebe, J., Hoffmann, P., "Recognizing contextual polarity in phrase-level sentiment analysis," Proc. Conf. on Human Language Technology and Empirical Methods in Natural Language Processing (HLT '05), pp. 347-354, ACL (2005)). In this lexicon, among other designations, words can be described as strong_subj and weak_subj for being commonly associated with strong and weak subjectivity, respectively. An assumption is made that strongly subjective words result in opinionated texts. For each text sample, if a word is marked as strong_subj it scores 1:0, if it is marked as weak_subj it scores 0:5, and all other words score 0. The opinion score is the average word score for the text, and a text is considered opinionated if its opinion score is above some threshold $\Gamma_O$.

For determining whether a text should be labeled with some category marker $c_k$, the second component uses average word probability, a method that is common in text summarization, is used (See, Nenkova, A., Vanderwende, L., McKeown, K., "A compositional context sensitive multi-document summarizer: exploring the factors that influence summarization," Proc. 29th Annual Intern'l ACM SIGIR conference on Research and development in information retrieval (SIGIR '06), pp. 573-580 (2006). Latent dirichlet allocation (LDA) is used to learn word distributions for each category, then a text sample's average word probability is considered under a word distribution for each category (See, Blei, D. M., Ng, A. Y., Jordan, M. I., "Latent dirichlet allocation," J. Mach. Learn. Res. 3, pp. 993-1022 (2003)).

Again, a text sample is considered to be a positive example for a category if its average word probability for that category is above some threshold $\Gamma_C$. The underlying methods used in this example are relatively basic, but the aim is to demonstrate whether the system can predict when each of the components is in error, given that the final observation resulted in an error. Because each component is made up of binary classifiers, the system can be improved in the light of user feedback without modifying the underlying components. This is achieved by wrapping each of the components in an error module wrapper such that when the error module predicts that the current input would result in an error, the prediction is flipped.

The data to summarize consists of a subset of public comments on the US Department of Agriculture's (USDA) proposed National Organic Program (NOP) ("USDA-TMD-94-00-2") obtained from http://erulemaking.cs.cmu.edu/data/USDA. These are comments by concerned citizens with respect to a proposed rule on what standards would apply to allow products to be designated as organic. This data is useful for testing the exemplary system because a sizable portion of the data contains no opinion and most of the text can be suitably placed into different categories given what aspect of the proposed legislation a citizen was referring to (animal well-being, genetically modified organisms, human health, etc.). 650 text samples from these comments were manually labeled as either containing opinion or not, and for membership in up to 6 categories. 100, 300, and 500 text samples were randomly selected for training and the rest were left for testing. In this experiment, the feedback is whether a comment is correctly identified as containing opinion and labeled with the correct category (f=0), or some labeling error exists.

Probabilistic Modeling

The goal is to determine which underlying component was the source of an error when the system only has access to partial feedback. Let $\{(x_m, k_m, y_m)\}_m^M$ be the set of triplets containing the input vector $x_m$ (e.g., a vector representation of a sequence of words), the label $k_m$, chosen by the system as the category, and $y_m \in \{0,1\}$, the user feedback. It is assumed that the feedback is a product of unobserved feedback on the two components, $y_m = r_m c_m$, where $r_m \in \{0,1\}$ and $c_m \in \{0,1\}$. When $r_m$ and $c_m$ are equal to zero, $y_m$ is deterministically equal to zero, i.e., the label is correct. However, when $r_m$ and/or $c_m$ is equal to one, there is no deterministic link between the feedback $y_m$ and the unobserved variables. It is therefore assumed that $y_m$ is a binary random variable: $y_m | r_m, c_m, x_m \sim$ Bernoulli $(p(y_m | r_m, c_m, x_m))$.

Logistic regression models the probability of $r_m$ and $c_m$ being equal to one (i.e., the probability of error) and $r_m$ and $c_m$ are assumed independent, given $x_m$. Then, $$p(r_m, c_m | k_m) = p(r_m | x_m) p(c_m | x_m, k_m)$$

$$p(r_m = 1 | k_m) = \sigma(x_m^T \beta_1)$$

$$p(c_m = 1 | x_m, k_m) = \sigma(x_m^T \beta_k)$$

where $\beta_1$ and $\beta = (\beta_k)_{k=1}^{k=6}$ are the model parameters. The complete likelihood of the $m^{th}$ observation is defined as follows:

$$p(y_m = 1, r_m, c_m | x_m, k_m) = \begin{cases} \sigma(x_m^T \beta_1) \sigma(x_m^T \beta_k) & \text{if } r_m = 1, c_m = 1 \\ (1 - \sigma(x_m^T \beta_1)) \sigma(x_m^T \beta_k) & \text{if } r_m = 0, c_m = 1 \\ \sigma(x_m^T \beta_1)(1 - \sigma(x_m^T \beta_k)) & \text{if } r_m = 1, c_m = 0 \\ 0 & \text{otherwise} \end{cases}$$

where the last equality follows from the constraint that $y_m = 0$ when $r_m = 0$ and $c_m = 0$. The sum of these probabilities is equal to $\sigma(x_m^T \beta_1) + \sigma(x_m^T \beta) - \sigma(x_m^T \beta_1) \sigma(x_m^T \beta)$. Hence, under this probabilistic model, the distribution of the source of the error is given by:

$$p(r_m, c_m | y_m = 1, x_m, k_m) = \begin{cases} \frac{\sigma(x_m^T \beta_1) \sigma(x_m^T \beta_k)}{\sigma(x_m^T \beta_1) + \sigma(x_m^T \beta_k) - \sigma(x_m^T \beta_1) \sigma(x_m^T \beta_k)} & \text{if } r_m = 1, c_m = 1 \\ \frac{(1 - \sigma(x_m^T \beta_1)) \sigma(x_m^T \beta_k)}{\sigma(x_m^T \beta_1) + \sigma(x_m^T \beta_k) - \sigma(x_m^T \beta_1) \sigma(x_m^T \beta_k)} & \text{if } r_m = 0, c_m = 1 \\ \frac{\sigma(x_m^T \beta_1)(1 - \sigma(x_m^T \beta_k))}{(x_m^T \beta_1) + \sigma(x_m^T \beta_k) - \sigma(x_m^T \beta_1) \sigma(x_m^T \beta_k)} & \text{if } r_m = 1, c_m = 0 \\ 0 & \text{otherwise} \end{cases}$$

From these expressions, the marginal probabilities of error can be deduced in closed form:

$$p(r_m = 1 \mid y_m = 1, x_m, k_m) = \frac{\sigma(x_m^T \beta_1)}{\sigma(x_m^T \beta_1) + \sigma(x_m^T \beta_k) - \sigma(x_m^T \beta_1)\sigma(x_m^T \beta_k)}$$

and $$p(c_m = 1 \mid y_m = 1, x_m, k_m) = \frac{\sigma(x_m^T \beta_k)}{\sigma(x_m^T \beta_1) + \sigma(x_m^T \beta_k) - \sigma(x_m^T \beta_1)\sigma(x_m^T \beta_k)}$$

FIG. 11 illustrates example text samples and the categories to which they have been manually assigned. The features used are a simple bag-of-words. The accuracy of all predicted labels for a "wrapped" system of the type illustrated in FIG. 2 is evaluated. That is, using the base system described above, the testing data is run through the pipeline, and at each component if, the error module 44, 46 predicts an error, that prediction is flipped. Each experiment is run 5 times with different random permutations of training and testing data. The average accuracy is shown in FIG. 12 for the opinion component and in FIG. 13 for the aspect component, as the number of feedback examples varies.

Figure 12:
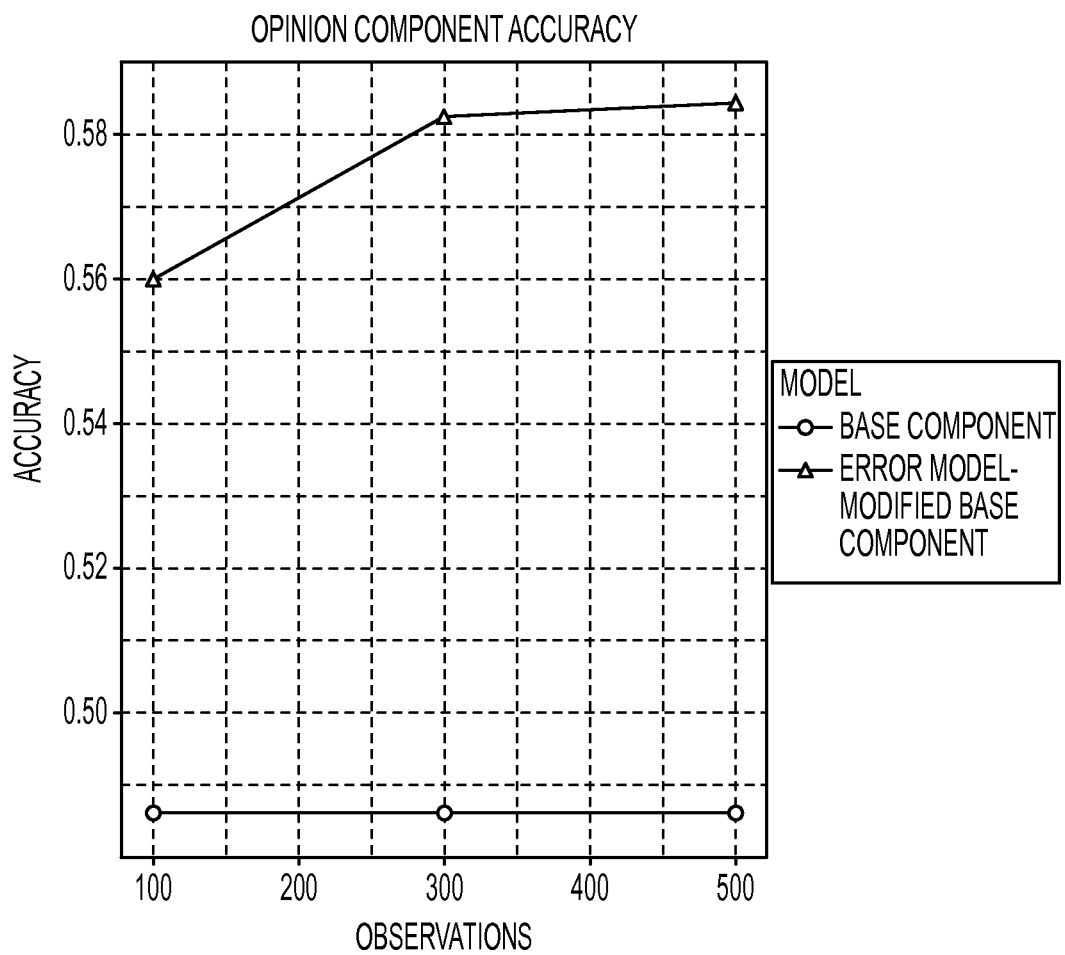
FIGS. 12 and 13 show accuracy results for the opinion and aspect pipeline components, respectively, of an augmented summarization system. The base curve shows the accuracy of the base pipeline components and the error curve shows the accuracy when the exemplary error prediction model is applied.
Figure 13:
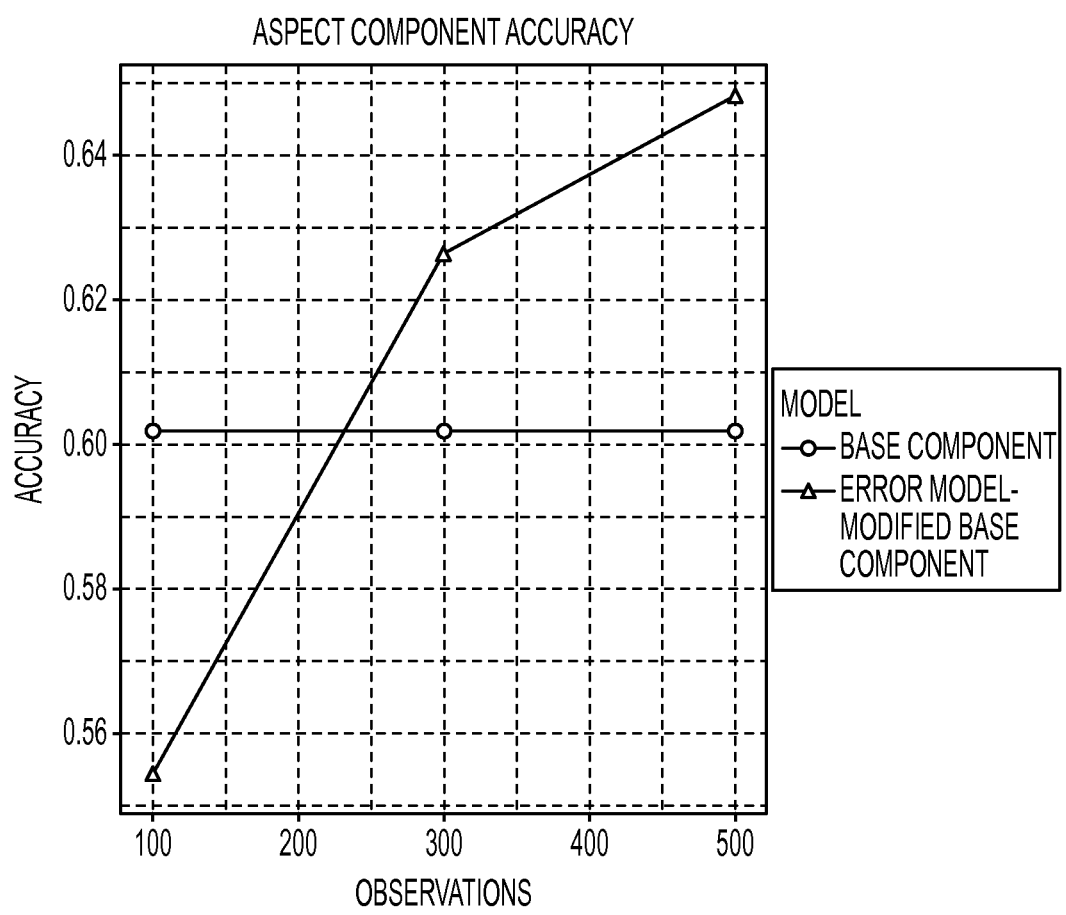

With 100 and more partial feedback examples, the error module-wrapped opinion component performs substantially better than the base component (FIG. 12). For the aspect labeling component (FIG. 13), 100 examples were found not to be enough to provide adequate predictive accuracy to perform better than the base component. However, with 300 labels and more, it readily surpasses the base component. The reason for this discrepancy may be attributed to data sparsity; each feedback example is only with respect to one aspect label and with 6 labels, a training set perfectly balanced amongst the 4 different error combinations would only include $$100 \times \frac{1}{6} \times \frac{1}{4} 4 \approx 4$$

training examples per context. As will be appreciated, in practice a perfect balance of training samples over the possible labels is generally not obtained, and certain contexts (labels) will be over-represented while others will have no training examples at all. Nevertheless, even with a relatively small amount of feedback, it can be seen that the system is able to predict the error configuration and therefore improve the accuracy of the overall system. In practice, when the error module is used as a wrapper in such an embodiment, it may only be activated once an appropriate amount of training data was obtained, which may be computed as a function of the number of labels or obtained from results for a similar pipeline.

Example 3

Error Detection in Machine Translation

A semi-synthetic experiment was performed in that the features are derived from true data, but the labels are partially synthetically generated. Machine Translation (MT) quality has yet to reach a state where translations can be used reliably without user supervision. Therefore, when a high quality translation is required, a post-editing stage is typically conducted. In post-editing, professional translators review and correct a translation before it is used. Error detection is therefore an important subject in machine translation (see, Xiong, D., Zhang, M., Li, H., "Error detection for statistical machine translation using linguistic features. In: Proceedings of the 48th Annual Meeting of the Association for Computational Linguistics," ACL '10, pp. 604-611 (2010) and Ueffing, N., Ney, H., "Word-level confidence estimation for machine translation," Comput. Linguist. 33(1) pp. 9-40 (March 2007)).

It would be a useful means of reducing post-editing effort to be able to direct the translator to specific segments in the translation which are estimated to be erroneous. This could also be used within the MT system itself, by avoiding erroneous translations and reverting to the next best alternatives proposed by the system in the light of a predicted error.

In this example, the error prediction model 34 is used to predict the phrases in a translated sentence that are most likely to contain errors. Each sentence is considered to be a pipeline and each phrase is considered to be a component of the pipeline. Feedback consists of either a perfectly translated sentence (f=0) or a sentence that contains at least one error (f=1). Four features are used for this experiment: the probability of the source phrase given the target phrase; the lexical weighting of the source phrase given the target phrase; the probability of the target phrase given the source phrase; and the lexical weighting of the target phrase given the source phrase. Each of these features is computed automatically using the Moses phrase-based statistical machine translation (SMT) system (see, Koehn, P., Hoang, H., Birch, A., Callison-Burch, C., Federico, M., Bertoldi, N., Cowan, B., Shen, W., Moran, C., Zens, R., Dyer, C., Bojar, O., Constantin, A., Herbst, E., "Moses: Open source toolkit for statistical machine translation," Proc. ACL, Demo and Poster Sessions (2007).

Because phrase-specific error labels are needed for evaluating the system, a synthetic approach is used for labeling. ~400 translated phrases are manually labeled as either containing or not containing an error and then an independent binary classifier is learned on this fully-labeled data. Using this classifier, labels are then generated for a set of 5000 sentences that are segmented into phrases. All of the sentences that contained 6 phrases or less were selected to provide 1002 training sentences. Each of these sentences receives a label f=1 if any of its phrases contain errors, and f=0 otherwise. The error prediction model was learned and then the prior probability of each phrase-pair containing an error was predicted.

Figure 14:
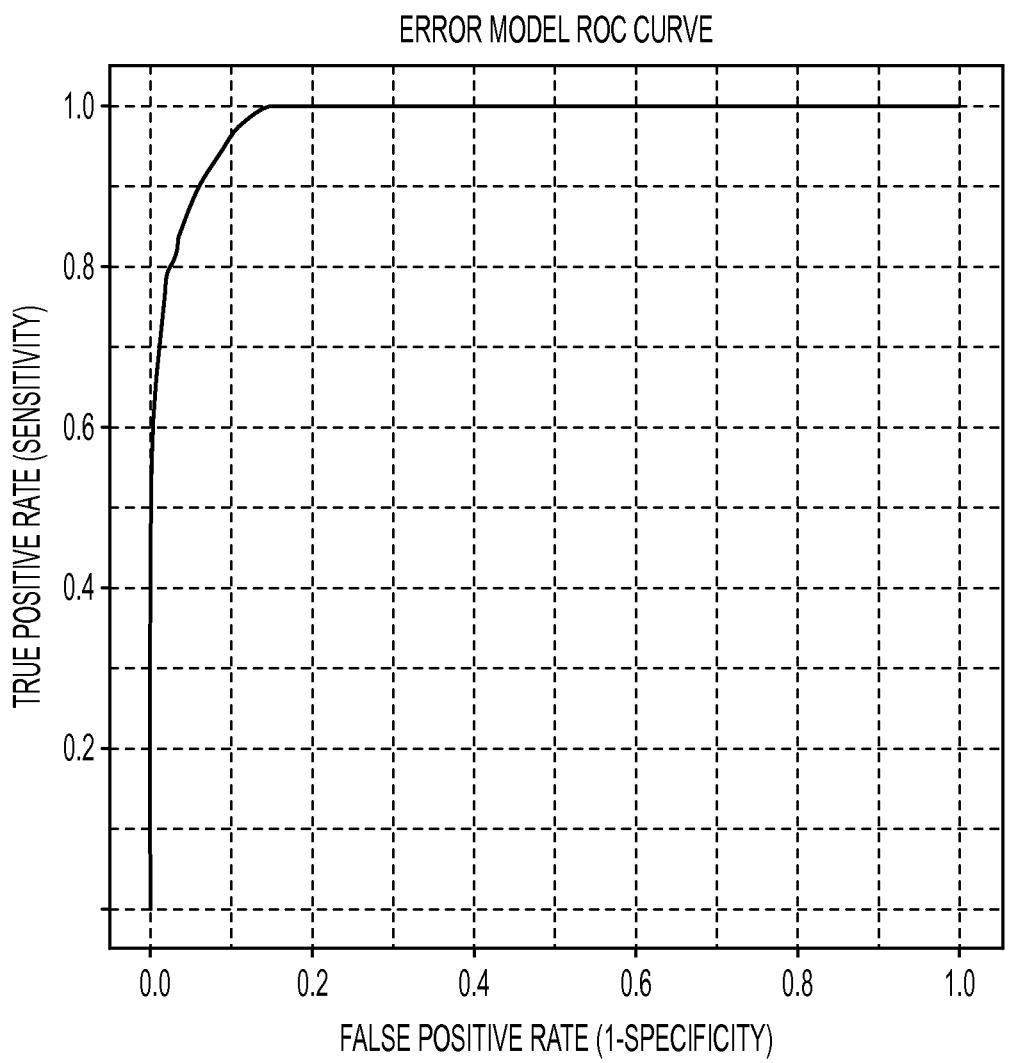
FIGS. 14 and 15 show receiver operating characteristic (ROC) curves for a machine translation pipeline with the error prediction model (FIG. 14) and a baseline system (FIG. 15).
Figure 15:
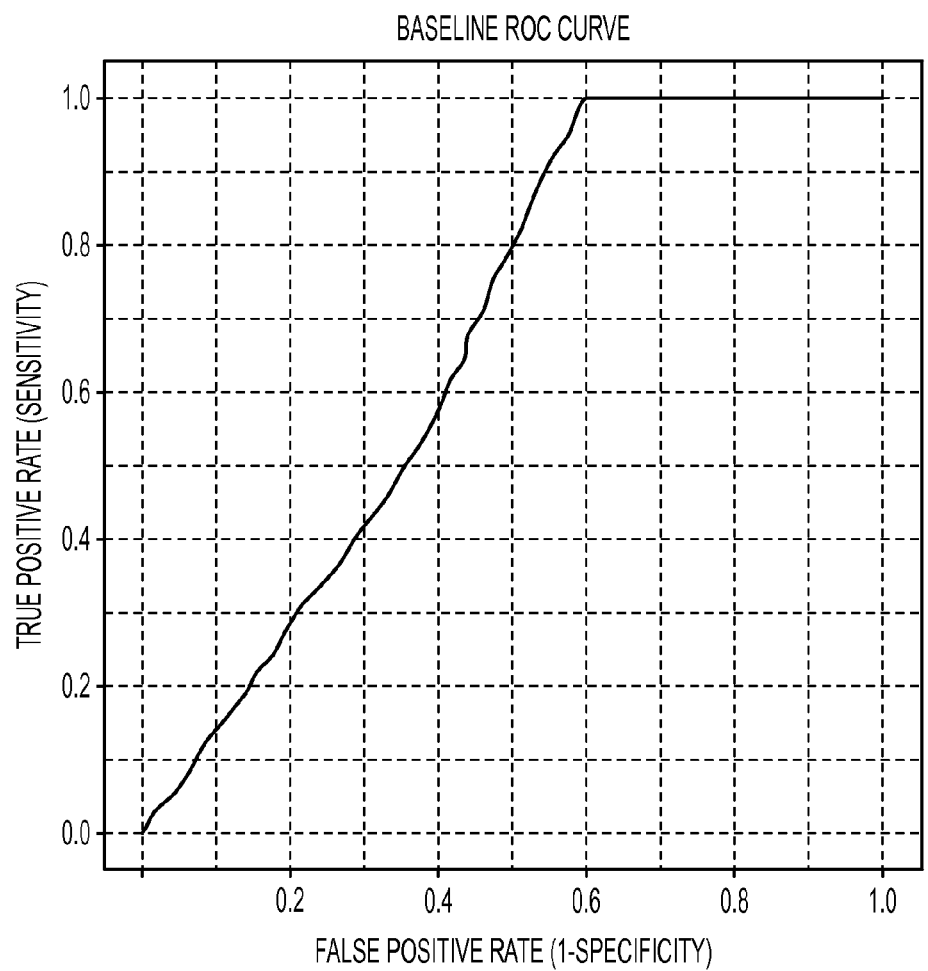

The exemplary prediction model is compared to a simple baseline. The baseline learns a binary logistic regression classifier on phrases where the labels are simply the partial feedback f. That is, when f=0, each phrase is an independent example with the (correct) label 0. When f=1, each phrase is also an independent example but now the label will only sometimes be correct. In fact, it will rarely be correct because most translated sentence errors are confined to 1 or 2 phrases. The behavior of the baseline is best understood by showing its receiver operating characteristic (ROC) curve. An ROC curve is created by plotting the fraction of true positives out of the positives (TPR=true positive rate) vs. the fraction of false positives out of the negatives (FPR=false positive rate), at various threshold settings. The ROC curves for each method are shown in FIGS. 14 and 15 and demonstrate that there is little problem with choosing a discrimination threshold in the present method (FIG. 14) and that the baseline (FIG. 15) is a poor method, especially when the density of errors in a pipeline is low.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for performing data processing through a pipeline of components, comprising:
   receiving a set of training observations for a pipeline which comprises a plurality of pipeline components, each observation comprising partial user feedback relating to error in data output by the pipeline for respective input data, wherein each of the plurality of pipeline components commits errors for at least some of the input data which contributes to an error in the respective output data;
   generating an error prediction model which, for each the plurality of components, models a probability of the component committing an error given input data, parameters of the error prediction model being learned using the set of training observations;
   receiving a new observation for the pipeline, the new observation comprising input data;
   probabilistically inferring which of the plurality of pipeline components in the pipeline contributed to any error in the data output by the pipeline, based on the input data for the new observation and the error prediction model; and
   outputting information based on the inference,
   wherein at least one of the generating an error prediction model and the probabilistically inferring which of the plurality of pipeline components contributed to the error in the data output by the pipeline is performed with a computer processor.

2. The method of claim 1, further comprising, for a pipeline component of the plurality of pipeline components which is inferred to have contributed to the error in the data output by the pipeline, modifying an output of the pipeline component.

3. The method of claim 2, wherein the modifying the output of the pipeline component comprises one of:
   providing an alternative output for the pipeline component where the component has only two possible component outputs; and
   providing an output for the pipeline component which is a next most likely output when the pipeline component has more than two possible outputs.

4. The method of claim 1, wherein the probabilistically inferring which of the plurality of components in the pipeline contributed to the error in the data output by the pipeline comprises for each pipeline component, extracting features based on the input data which are relevant to the pipeline component and applying the error prediction model to the extracted features.

5. The method of claim 1, wherein the model parameters are learned through a maximum likelihood estimation.

6. The method of claim 5, wherein the maximum likelihood estimation is performed with one of batch gradient descent, stochastic gradient descent, and Expectation Maximization.

7. The method of claim 1, wherein the partial user feedback is a first of two possible values when there is an error observed in the output of the pipeline and a second of the two possible values when there is no error observed in the output of the pipeline.

8. The method of claim 1, wherein in learning the model, it is assumed that each error committed by one pipeline component in the plurality of pipeline components is independent of any errors committed by each other pipeline component in the plurality of pipeline components.

9. The method of claim 1, wherein in generating the model, the probability that a pipeline component will commit an error given the input data is modeled as a Bernoulli random variable using a probabilistic function.

10. The method of claim 9, wherein the probability that a pipeline component n from the plurality of pipeline components will commit an error $e_n$ given input data x is modeled as:

$$p(e_n=1|x,\beta)=\sigma(\phi_n(x)^T\beta),$$

where $\sigma(.)$ represents the probabilistic function, $\beta$ represents the parameters of the model and $\phi_n(x)$ represents features extracted, based on the input data, that are relevant for the pipeline component n.

11. The method of claim 9, wherein the probabilistic function is a binary logistic function.

12. The method of claim 1, wherein the plurality of pipeline components comprises a first pipeline component which processes one of the input data and output data from an upstream pipeline component, the first pipeline component outputting processed data to one of a second of the plurality of pipeline components and an intermediate pipeline component intermediate the first and second pipeline components.

13. The method of claim 1, wherein the method includes learning a weight for each of the plurality of pipeline components for each of a plurality of error configurations in which at least one of the components is assumed to have committed an error and, based on the weights, computing parameters of the error prediction model.

14. The method of claim 13, wherein the weights and parameters are learned iteratively by expectation-maximization.

15. The method of claim 13, wherein the probabilistically inferring which of the plurality of pipeline components in the pipeline contributed to any error in the data output by the pipeline comprises outputting one of the plurality of error configurations which indicates for each of the plurality of components, whether the component is predicted to have produced an error in generating an output, based on the input it receives.

16. The method of claim 1, wherein for at least some of the training observations, the partial user feedback indicates that there is an error in the data output and for others of the observations, the partial user feedback indicates there is no error in the data output.

17. The method of claim 1, wherein the new observation includes partial user feedback relating to error in data output by the pipeline for the input data, the user feedback for the new observation indicating that an error has occurred without specifying which of the plurality of pipeline components contributed to the error.

18. A system comprising memory which stores instructions for performing the method of claim 1 and a processor in communication with the memory for executing the instructions.

19. A computer program product comprising a non-transitory recording medium storing instructions, which when executed on a computer causes the computer to perform the method of claim 1.

20. A system for performing data processing through a pipeline of components, comprising:
   a learning component which generates an error prediction model which models a probability of at least one of a plurality of pipeline components forming a pipeline committing an error for input data, parameters of the error prediction model being learned using a set of training observations, each observation comprising partial user feedback relating to error in data output by the pipeline for respective input data, wherein each of the plurality of pipeline components commits errors for at least some of the input data which contributes to an error in the respective output data;

an error prediction component which for a new observation for the pipeline, determines which of the plurality of pipeline components in the pipeline contributed to the error in the data output by the pipeline, based on the input data for the new observation and the error prediction model, the new observation comprising input data and optionally further including partial user feedback relating to error in data output by the pipeline for the input data, the partial user feedback for the new observation indicating that an error has occurred without specifying which of the pipeline components contributed to the error; and a processor which implements the learning component and the error prediction component.

21. The system of claim 20, wherein each of the plurality of pipeline components is wrapped with an error module which modifies the output of the respective pipeline component when the error prediction component determines that the pipeline component contributed to the error.

22. A method for performing data processing through a pipeline of components, comprising:

providing an error prediction model in computer memory which, for a plurality of pipeline components of a pipeline, models a probability of at least one of the plurality of pipeline components committing an error for input data, parameters of the error prediction model having been learned using a set of training observations, each training observation comprising user feedback relating to error in data output by the pipeline for respective input data, wherein each of the plurality of pipeline components commits errors for at least some of the input data which contributes to an error in the respective output data;

wrapping each of the plurality of pipeline components in an error module which modifies the output of the respective pipeline component when the error prediction model predicts that the pipeline component has contributed to an observed error in output data;

receiving a new observation for the pipeline, the new observation comprising input data, the new observation optionally further including user feedback relating to error in data output by the pipeline for the input data, the user feedback for the new observation indicating that an error has occurred without specifying which of the plurality of pipeline components contributed to the error; and determining which of the plurality of pipeline components in the pipeline contributed to an error in the data output by the pipeline, based on the input data for the new observation and the error prediction model, wherein the determining which of the plurality of pipeline components contributed is performed with a computer processor.

* * * * *